(12) United States Patent
Asai

(10) Patent No.: US 12,423,360 B2
(45) Date of Patent: Sep. 23, 2025

(54) INFORMATION PROCESSING SYSTEM AND NON-TRANSITORY COMPUTER READABLE MEDIUM STORING PROGRAM FOR DATA CATEGORIZATION

(71) Applicant: FUJIFILM Business Innovation Corp., Tokyo (JP)

(72) Inventor: Keita Asai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 697 days.

(21) Appl. No.: 17/320,674

(22) Filed: May 14, 2021

(65) Prior Publication Data

US 2022/0197957 A1    Jun. 23, 2022

(30) Foreign Application Priority Data

Dec. 23, 2020    (JP) .................................. 2020-213257

(51) Int. Cl.
| | | |
|---|---|---|
| G06F 3/048 | (2013.01) | |
| G06F 3/04817 | (2022.01) | |
| G06F 16/93 | (2019.01) | |
| G06F 40/114 | (2020.01) | |
| G06V 30/413 | (2022.01) | |

(52) U.S. Cl.
CPC .......... *G06F 16/94* (2019.01); *G06F 3/04817* (2013.01); *G06F 40/114* (2020.01); *G06V 30/413* (2022.01)

(58) Field of Classification Search
CPC .... G06F 16/94; G06F 40/114; G06F 3/04817; G06V 30/413
See application file for complete search history.

(56) References Cited

U.S. PATENT DOCUMENTS

| | | | |
|---|---|---|---|
| 7,746,512 B2* | 6/2010 | Yamakado | G06T 11/60 |
| | | | 382/209 |
| 9,423,926 B2* | 8/2016 | Ouzts | G06F 3/04842 |
| 9,773,289 B2* | 9/2017 | Min | G06V 20/70 |
| 10,015,355 B2 | 7/2018 | Kiyozuka | |
| 10,382,635 B2* | 8/2019 | Yamamoto | G06F 3/1206 |
| 10,963,503 B2* | 3/2021 | Skiles | G06N 20/10 |
| 2003/0130993 A1* | 7/2003 | Mendelevitch | G06F 16/355 |
| 2006/0165295 A1* | 7/2006 | Matsueda | G06V 10/987 |
| | | | 715/221 |
| 2007/0067295 A1* | 3/2007 | Parulski | G06F 16/58 |

(Continued)

FOREIGN PATENT DOCUMENTS

| | | |
|---|---|---|
| JP | H11-282956 A | 10/1999 |
| JP | 2018-28717 A | 2/2018 |
| JP | 2019-121085 A | 7/2019 |

OTHER PUBLICATIONS

Aug. 20, 2024 Office Action issued in Japanese Patent Application No. 2020-213257.

(Continued)

*Primary Examiner* — Mahelet Shiberou
(74) *Attorney, Agent, or Firm* — Oliff PLC

(57) ABSTRACT

An information processing system includes a processor configured to, in response to reception of operation performed by an operator to link an image to an icon image for image categorization, link a feature of the image subjected to the operation to the icon image.

6 Claims, 19 Drawing Sheets

(56) References Cited

U.S. PATENT DOCUMENTS

| | | | |
|---|---|---|---|
| 2009/0067729 A1* | 3/2009 | Turkelson | G06F 16/353 |
| | | | 382/224 |
| 2009/0154778 A1* | 6/2009 | Lei | G06V 30/413 |
| | | | 382/112 |
| 2010/0284623 A1* | 11/2010 | Chen | G06V 30/414 |
| | | | 382/224 |
| 2013/0215476 A1* | 8/2013 | Hashimoto | H04N 1/3333 |
| | | | 358/448 |
| 2015/0185975 A1* | 7/2015 | Hasegawa | G06F 3/0486 |
| | | | 715/765 |
| 2016/0147386 A1* | 5/2016 | Han | H04N 1/00411 |
| | | | 715/838 |
| 2017/0091544 A1* | 3/2017 | Adachi | G06V 30/1983 |
| 2017/0142274 A1* | 5/2017 | Koyanagi | H04N 1/00801 |
| 2018/0113579 A1* | 4/2018 | Johnston | H04N 21/4312 |
| 2019/0027117 A1* | 1/2019 | Ito | G06F 3/0412 |
| 2019/0156122 A1* | 5/2019 | Lu | G06V 10/761 |
| 2020/0394441 A1* | 12/2020 | Wen | G06V 10/764 |
| 2022/0058391 A1* | 2/2022 | Kumar | G06N 3/08 |

OTHER PUBLICATIONS

Dec. 24, 2024 Office Action issued in Japanese Patent Application No. 2020-213257.
May 30, 2025 Office Action issued in Chinese Patent Application No. 202110718744.7.

\* cited by examiner

FIG. 17

| FORM CATEGORY | PRIORITY | IDENTIFICATION METHOD |
|---|---|---|
| LEASE AGREEMENT | 1 | TEXT DETERMINATION, MACHINE LEARNING DETERMINATION |
| LOAN AGREEMENT | 2 | MACHINE LEARNING DETERMINATION |
| DRIVER'S LICENSE | 3 | MACHINE LEARNING DETERMINATION |
| RESIDENT CARD | 4 | REGISTERED FILE NAME |
| TRANSMITTAL LETTER | 5 | BARCODE, QR CODE |
| DESIGN DRAWING | 6 | PARTIAL IMAGE (TEMPLATE MATCHING) |

INFORMATION PROCESSING SYSTEM AND NON-TRANSITORY COMPUTER READABLE MEDIUM STORING PROGRAM FOR DATA CATEGORIZATION

CROSS-REFERENCE TO RELATED APPLICATIONS

This application is based on and claims priority under 35 USC 119 from Japanese Patent Application No. 2020-213257 filed Dec. 23, 2020.

BACKGROUND (i) Technical Field

The present disclosure relates to an information processing system and a non-transitory computer readable medium storing a program.

(ii) Related Art

Japanese Unexamined Patent Application Publication No. 2018-28717 discloses the following processes. In response to identification of a plurality of key documents, dependency relationships of processes for the respective key documents are determined based on the key documents and relevant documents related to the processes. The order of execution of the processes for the respective key documents is determined based on the dependency relationships.

SUMMARY

Aspects of non-limiting embodiments of the present disclosure relate to the following circumstances. To sort a plurality of images into predetermined categories, sorting criteria may be preset. When a user manually sets the criteria, the user's burden increases.

Aspects of non-limiting embodiments of the present disclosure therefore relate to reduction of the user's burden for image sorting compared with the case where the user manually sets the criteria for the image sorting.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising a processor configured to, in response to reception of operation performed by an operator to link an image to an icon image for image categorization, link a feature of the image subjected to the operation to the icon image.

BRIEF DESCRIPTION OF THE DRAWINGS

An exemplary embodiment of the present disclosure will be described in detail based on the following figures, wherein:

FIG. 17 illustrates a priority table;

DETAILED DESCRIPTION

An exemplary embodiment of the present disclosure is described below in detail with reference to the accompanying drawings.

Figure 1:
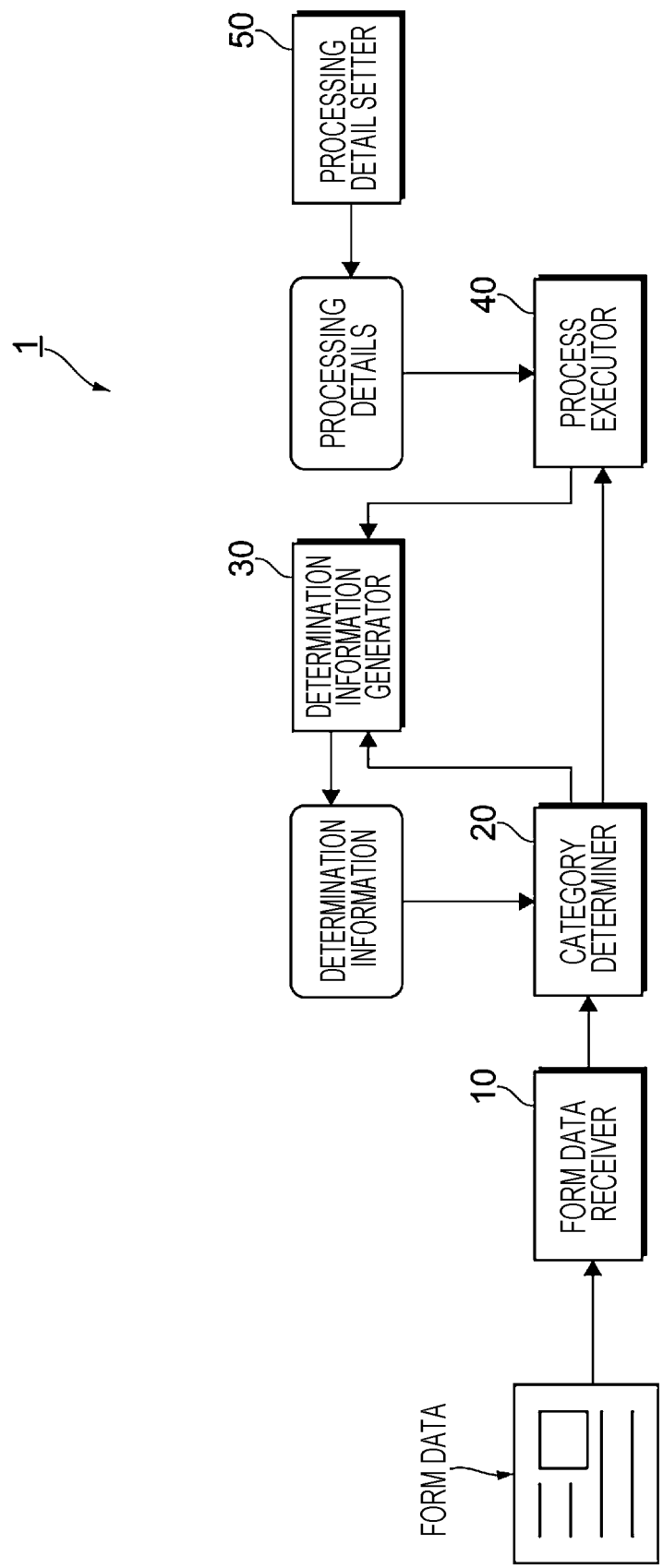
FIG. 1 illustrates an information processing system.

FIG. 1 illustrates an information processing system 1 of this exemplary embodiment.

The information processing system 1 of this exemplary embodiment includes a form data receiver 10 that receives form data, a category determiner 20 that determines a category of a form indicated by the form data, and a determination information generator 30 that generates determination information for use in determination of the category of the form.

The information processing system 1 further includes a process executor 40 that executes a predetermined process on the form data, and a processing detail setter 50 that sets details of the process to be executed by the process executor 40.

The form data receiver 10 receives form data. More specifically, the form data is image data obtained by scanning a form. The form data receiver 10 receives the image data.

The category determiner 20 determines a category of the form indicated by the input form data by using determination information generated by the determination information generator 30. More specifically, the category determiner 20 uses determination information prepared in advance to determine which category corresponds to the category of the form indicated by the form data.

When the category determiner 20 determines the category of the form, a determination result (information indicating the category of the form) and the form (form data) are sent to the process executor 40.

The process executor 40 executes, on the sent form, a process linked to the category obtained by the category determiner 20. In this exemplary embodiment, processes to be executed are preset for individual categories of forms. The process executor 40 executes the process linked to the category of the sent form.

In this exemplary embodiment, the process executor 40 may return the form to the determination information generator 30.

In this exemplary embodiment, a checker may visually check the form in the course of the process executed by the process executor 40. In this check, the checker may judge that the category determined by the category determiner 20 is wrong.

In this case, the process executor 40 returns the form to the determination information generator 30. More specifically, the process executor 40 notifies the determination information generator 30 that the determined category is wrong.

In this exemplary embodiment, the determination information generator 30 generates, as described later, new determination information to achieve correct determination about the returned form.

The "form" is a generic term for a ledger, a slip, and the like, and is any medium such as paper having blank fields to fill in. In this exemplary embodiment, the process on the form is described but the information processing system 1 of this exemplary embodiment is also applicable to general documents other than the form.

Figure 2:
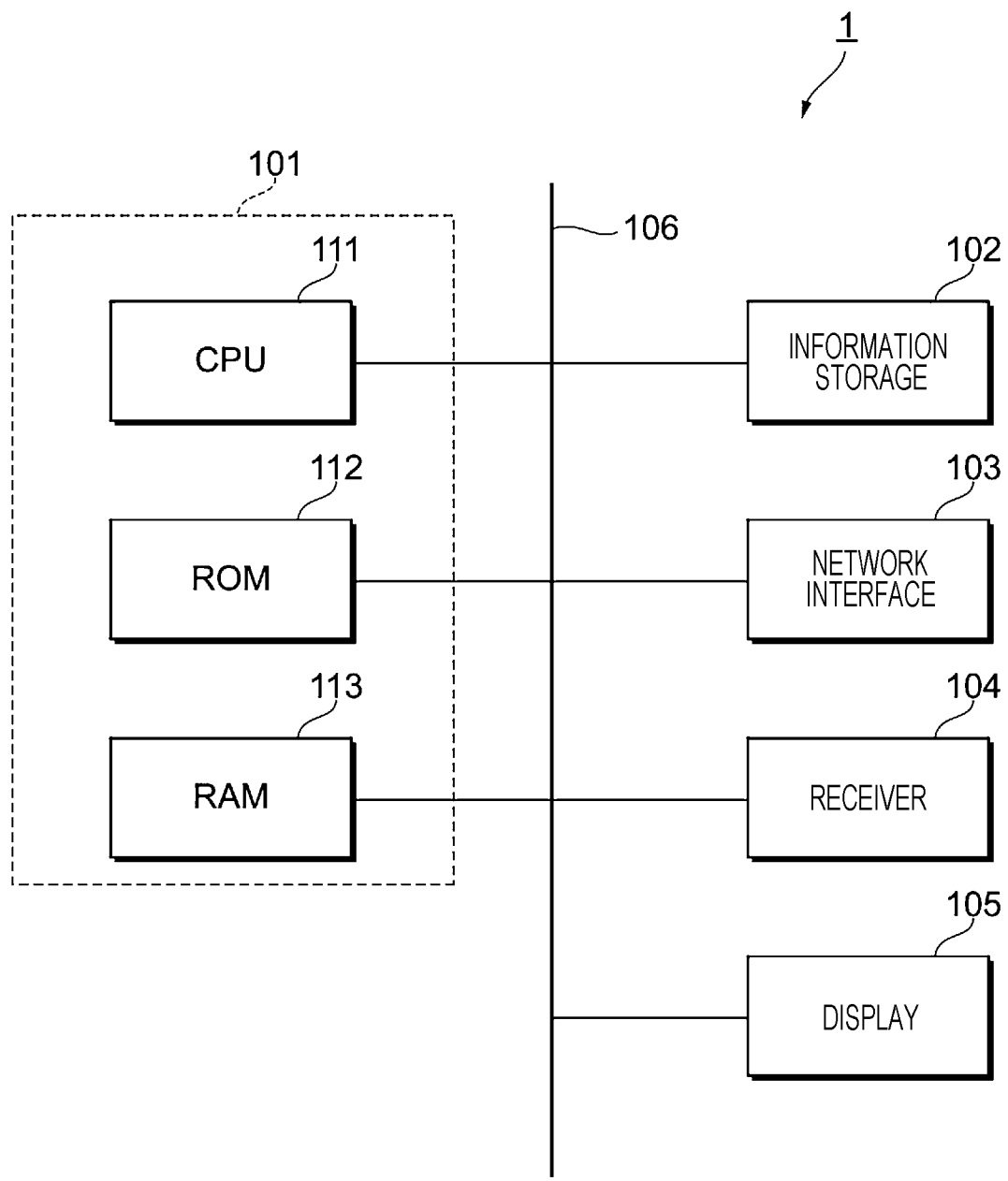
FIG. 2 illustrates an example of the hardware configuration of the information processing system.

FIG. 2 illustrates an example of the hardware configuration of the information processing system 1.

The information processing system 1 of this exemplary embodiment includes an information processor 101, an information storage 102 that stores information, and a network interface 103 that establishes communication via, for example, a local area network (LAN) cable.

The information processing system 1 further includes a receiver 104 that receives operator's operation, and a display 105 that displays information.

The receiver 104 is constituted by a keyboard and a mouse. In this exemplary embodiment, the receiver 104 receives information input to the information processing system 1 by the operator.

The keyboard and the mouse are examples and the receiver 104 is not particularly limited. Other examples of the receiver 104 include a touch panel and a device that receives information input by the operator by recognizing operator's voice.

The display 105 is a liquid crystal display or an organic EL display. In this exemplary embodiment, the display 105 displays various screens described later.

The information storage 102 is an existing information storage such as a hard disk drive. The hard disk drive is a device that reads data from and writes data into a non-volatile storage medium having a magnetic substance applied to the surface of a disc-like substrate. The information storage 102 may be a semiconductor memory or a magnetic tape.

The information processor 101 includes a central processing unit (CPU) 111 that is an example of a processor, a read only memory (ROM) 112 that stores, for example, basic software and a basic input/output system (BIOS), and a random access memory (RAM) 113 to be used as a working area.

The CPU 111 may be a multi-core CPU. The ROM 112 may be a rewritable non-volatile semiconductor memory. The information processor 101 is a so-called computer.

The information processor 101, the information storage 102, the network interface 103, the receiver 104, and the display 105 are connected through a bus 106 and signal lines (not illustrated).

Programs to be executed by the CPU 111 may be provided to the information processing system 1 while being stored in a computer readable recording medium such as a magnetic recording medium (e.g., a magnetic tape or a magnetic disk), an optical recording medium (e.g., an optical disc), a magneto-optical recording medium, or a semiconductor memory. The programs may be provided to the information processing system 1 by using a communication system such as the Internet.

In this exemplary embodiment, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In this exemplary embodiment, the term "processor" is broad enough to encompass one processor or plural processors in collaboration which are located physically apart from each other but may work cooperatively. The order of operations of the processor is not limited to one described in the embodiments above, and may be changed.

In this exemplary embodiment, the CPU 111 that is an example of the processor implements the form data receiver 10, the category determiner 20, the determination information generator 30, the process executor 40, and the processing detail setter 50 by executing the programs stored in the ROM 112 or the information storage 102.

Processes described below are executed by the form data receiver 10, the category determiner 20, the determination information generator 30, the process executor 40, and the processing detail setter 50. In other words, the processes are executed by the CPU 111 that is an example of the processor that implements the functional components.

The various processes may be executed by a single information processing apparatus including the processor or by a plurality of information processing apparatuses each including the processor.

Figure 3:
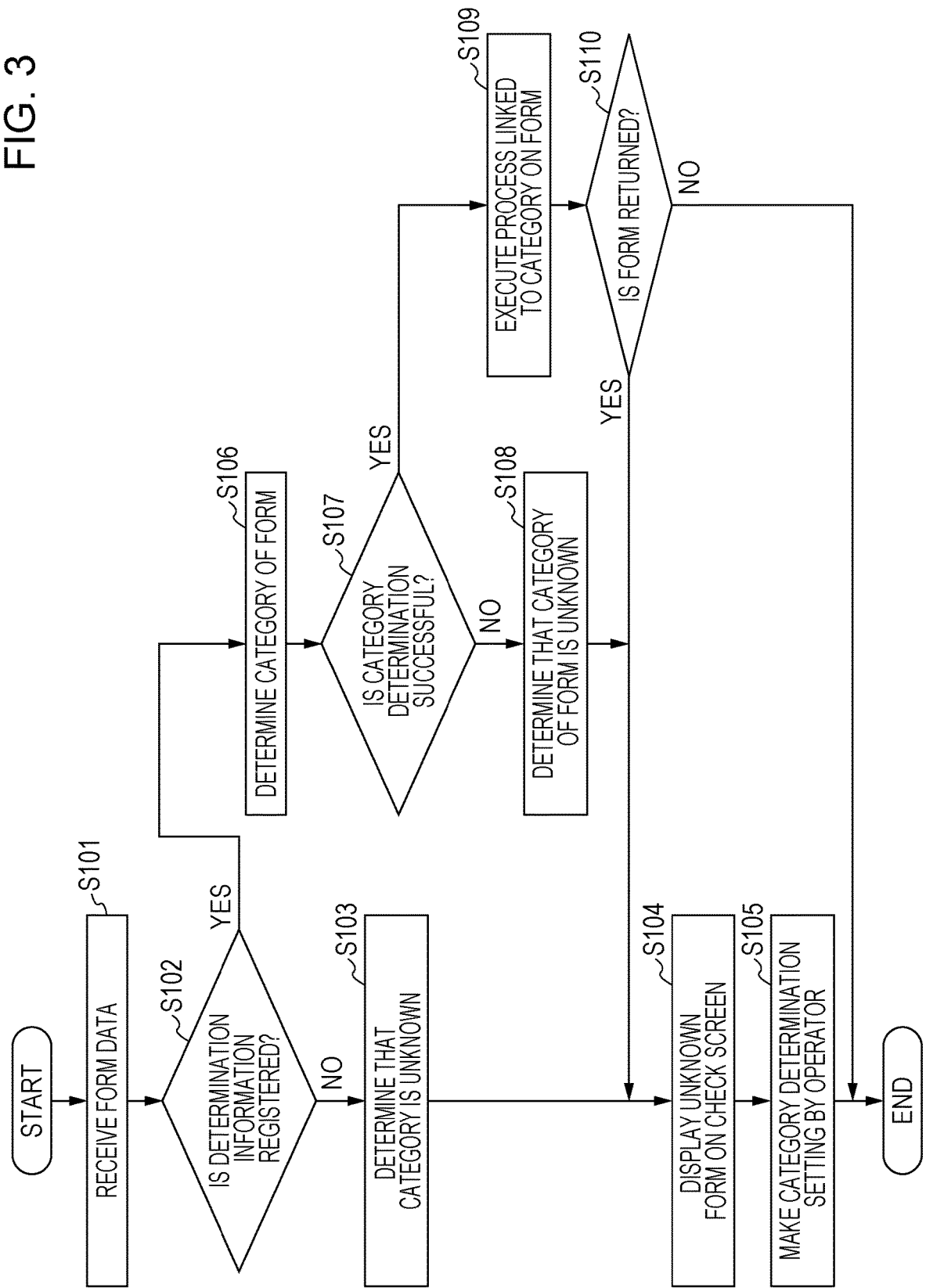
FIG. 3 is a flowchart illustrating an example of a flow of processes to be executed in the information processing system.

FIG. 3 is a flowchart illustrating an example of a flow of processes to be executed in the information processing system 1.

In this exemplary embodiment, form data is first input to the information processing system 1, and the form data receiver 10 receives the form data (Step S101).

More specifically, image data obtained by scanning a form as described above is input to the information processing system 1 as the form data, and the form data receiver 10 receives the image data as the form data.

In this exemplary embodiment, the category determiner 20 determines whether determination information for use in determination of a category of the form is registered in the information processing system 1 (Step S102).

If determination is made, in Step S102, that the determination information is not registered, the determination of the category of the form is not executable. In this case, the category determiner 20 determines that the category of the input form is unknown (Step S103).

In this exemplary embodiment, the form whose category is determined to be unknown (unknown form) is displayed on a check screen (described later) (Step S104).

In this case, the operator operates the check screen to make setting for achieving the determination of the category of the form (hereinafter referred to as "category determination setting") (Step S105).

Figure 4:
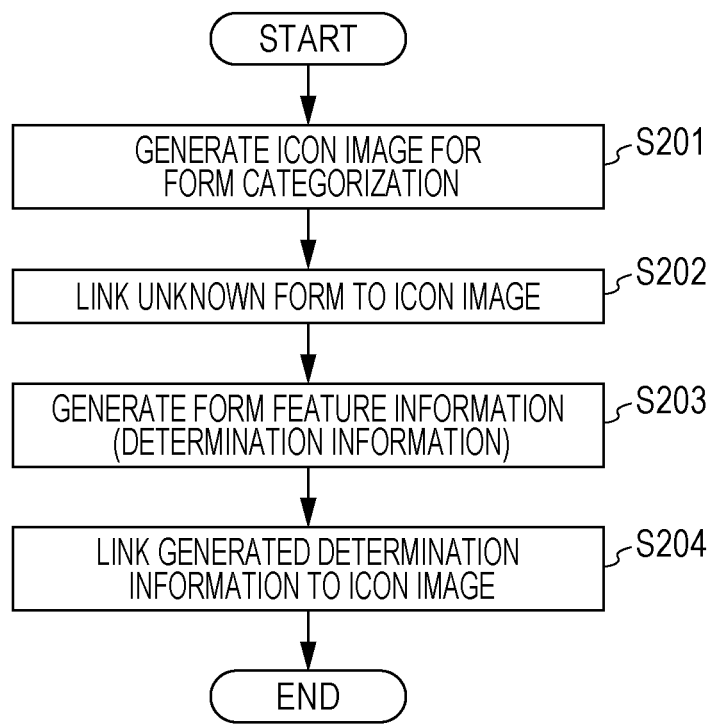
FIG. 4 is a flowchart illustrating a flow of processes to be executed when an operator makes category determination setting.

FIG. 4 is a flowchart illustrating a flow of processes to be executed when the operator makes the category determination setting in Step S105.

In this exemplary embodiment, when the operator makes the category determination setting, the operator operates the check screen showing the form whose category is determined to be unknown.

Specifically, the operator operates the check screen to first generate an icon image for categorization of the form (Step S201).

In other words, the operator generates an icon image for categorization of an image of the form in the check screen (form image). The generated icon image is displayed on the check screen.

The operator further operates the check screen to link the generated icon image to the form whose category is determined to be unknown (unknown form) (Step S202).

Specifically, the operator performs a so-called drag-and-drop operation to move the form image showing the unknown form to the icon image, thereby linking the icon image to the form image.

In this exemplary embodiment, the determination information generator 30 analyzes the form image linked to the icon image to acquire information indicating a feature of the form image (hereinafter referred to as "form feature information").

The form feature information is an example of the determination information. In this process, the determination information generator 30 generates the form feature information as an example of the determination information (Step S203).

The determination information generator 30 links the generated determination information to the generated icon image (Step S204). In other words, the determination information generator 30 links the form feature information to the icon image.

In this exemplary embodiment, the determination information for use in the determination of the category of the form is generated and linked to the icon image. In other words, the determination information is linked to the category of the form in this exemplary embodiment.

In this exemplary embodiment, the operator performs the so-called drag-and-drop operation as described above to move the form image to the icon image, thereby linking the form image to the icon image.

Thus, the form feature information on the feature of the form (form image) is linked to the icon image. In other words, the determination information obtained based on the form is linked to the icon image.

Through the processes described above, the category determination setting in Step S105 of FIG. 3 is completed. When a new form is input afterwards, the determination information set through the category determination setting is used to make determination of a category of the new form.

The processes of FIG. 3 are further described.

If determination is made, in Step S102, that the determination information is registered, the category of the form in the form data received in Step S101 is determined by using the registered determination information (Step S106).

In Step S107, determination is made whether the category is successfully determined.

If determination is made, in Step S107, that the category of the form is not successfully determined, determination is made that the category of the form is unknown (Step S108).

In this case, the processes of Step S104 and subsequent steps are executed.

That is, the unknown form is displayed on the check screen and then the operator makes the category determination setting.

If determination is made, in Step S107, that the category of the form is successfully determined, the process executor 40 executes a process linked to the determined category on the form (form data) (Step S109).

In this exemplary embodiment, determination is made whether the processed form is returned (Step S110).

That is, determination is made whether the checker judges that the category determined by the category determiner 20 is wrong.

In this exemplary embodiment, the checker may visually check the form as described above. The form is returned if the checker judges that the determined category is wrong.

In response to the return, the processes of Step S104 and subsequent steps are executed.

Similarly to the above, the form returned because of its wrong category is first displayed on the check screen. Subsequently, the operator makes the category determination setting to achieve correct determination of the category of the returned form.

In the category determination setting, for example, a new icon image is generated and the form image is linked to the icon image. As described later, the category determination setting may be made for text determination.

Figure 5:
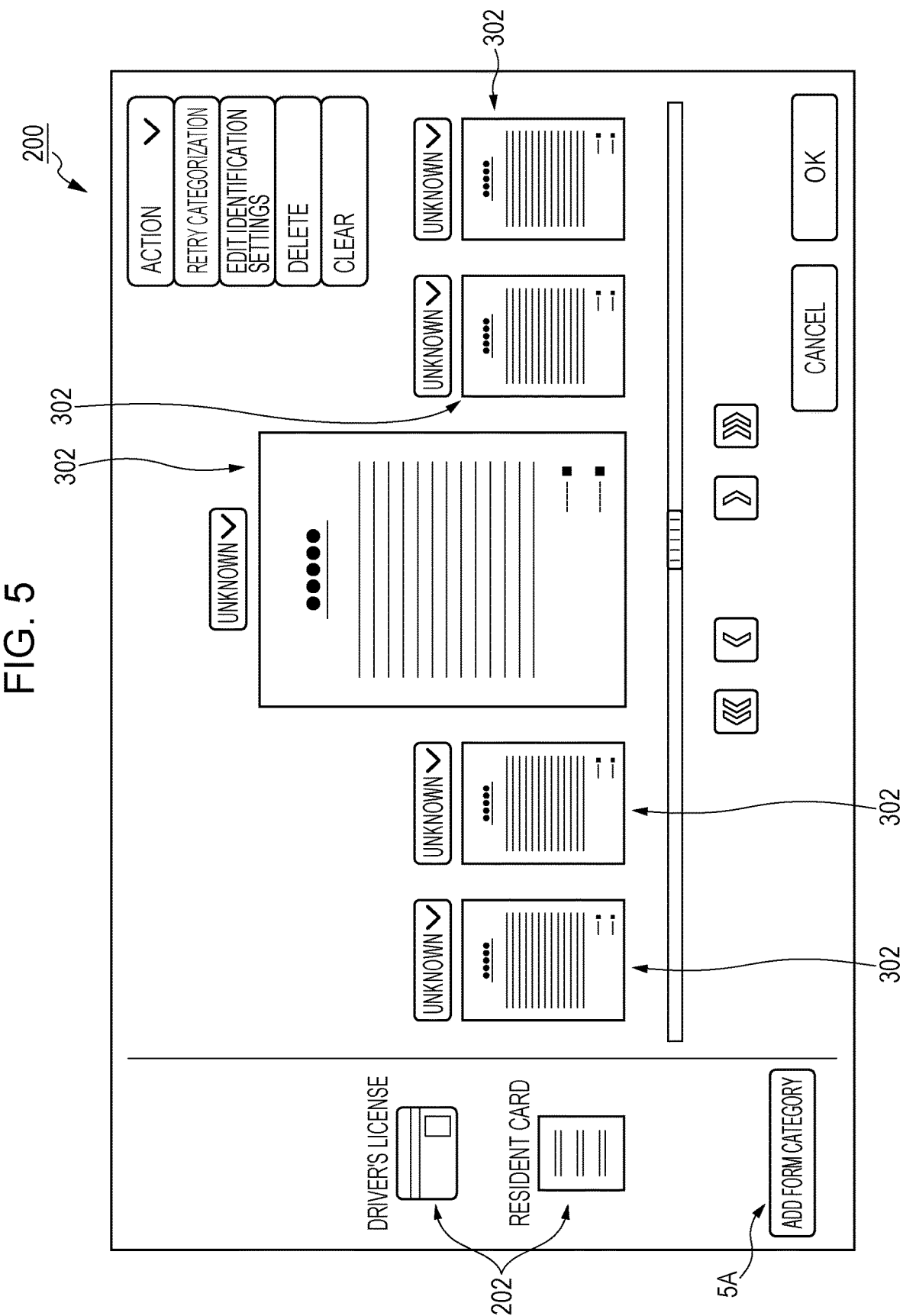
FIG. 5 illustrates a check screen.

FIG. 5 illustrates the check screen.

The category determination setting is described in detail with reference to FIG. 5, FIG. 6, and other subsequent figures.

In this exemplary embodiment, a form image 302 showing an unknown form and a form image 302 showing a returned form are displayed on a check screen 200 illustrated in FIG. 5.

The left field of the check screen 200 is provided for existing icon images 202 showing categories of forms.

In this exemplary embodiment, determination information for use in determination of a category of a form is linked to each icon image 202.

More specifically, information on the icon image 202 and the determination information are registered in the information storage 102 (see FIG. 2) while being linked together.

Texts "unknown" are displayed above the plurality of form images 302 in the check screen 200 to indicate that the categories of the forms in the form images 302 are unknown.

For example, each form image 302 having the text "unknown" shows a form whose category is not successfully determined based on the determination information linked to the existing icon image 202.

For example, each form image 302 having the text "unknown" also shows a form returned because the determined category is wrong.

On the check screen 200, the operator first checks details of each form image 302 having the text "unknown". The operator checks whether any existing icon image 202 is linked to the details of each form image 302.

If no icon image 202 is linked to the form image 302, the operator selects an item "Add form category" 5A at the lower left of the check screen 200.

Figure 6:
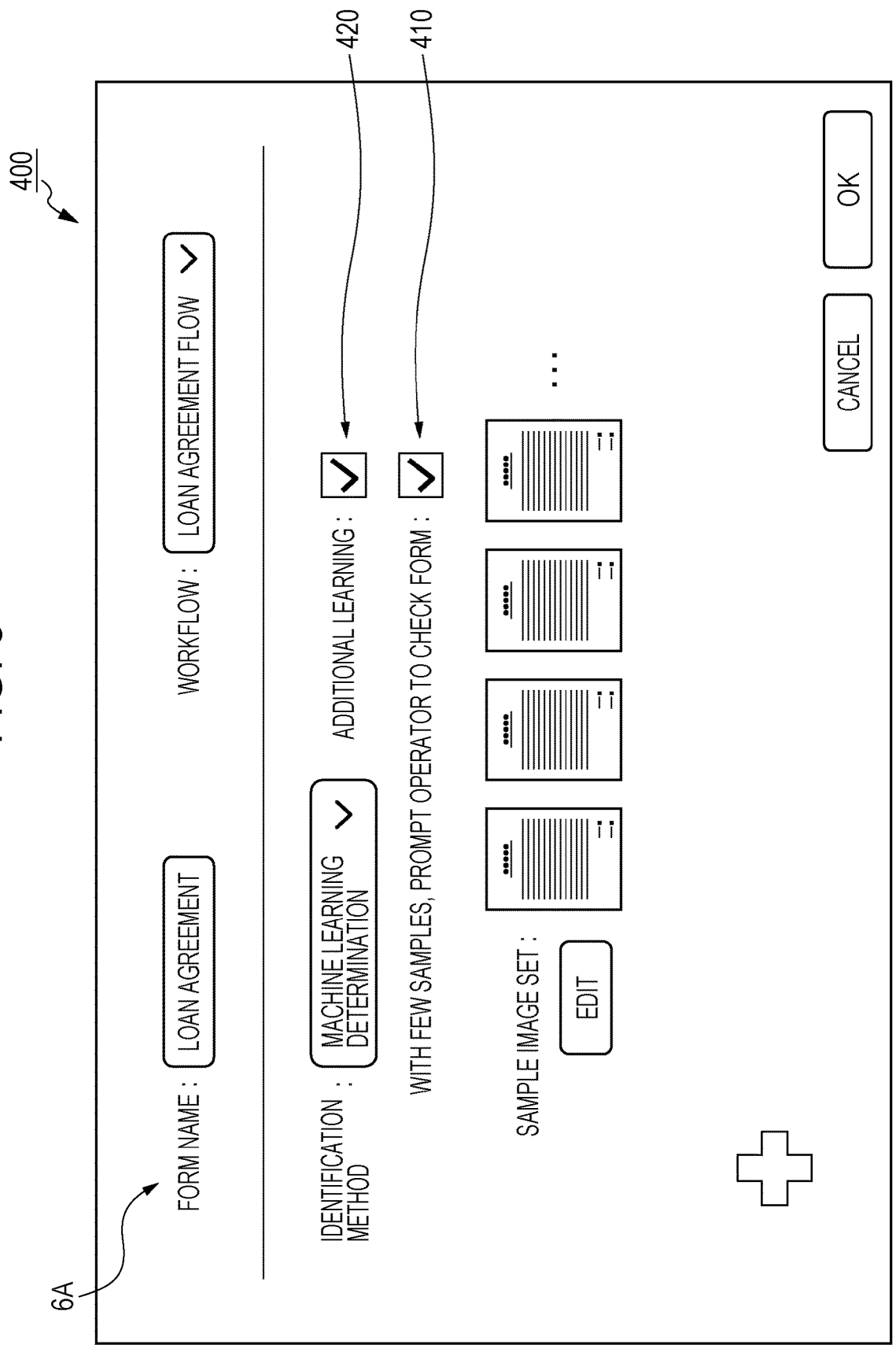
FIG. 6 illustrates an icon image generation screen.

Then, a generation screen 400 for generating a new icon image 202 is displayed as illustrated in FIG. 6.

The generation screen 400 has a field "Form name" 6A at the upper left of the screen. The operator inputs a specific name to the field by using the receiver 104 (see FIG. 2) including the keyboard while grasping the details of the form image 302 (see FIG. 5) having the text "unknown".

In other words, the operator inputs a specific name for identification of a category. FIG. 6 exemplifies a case where a name "loan agreement" is input.

The generation screen 400 provides an option 410 that reads "With few samples, prompt operator to check form". In this example, the option 410 is selected by the operator.

The generation screen 400 also provides an option 420 that reads "Additional learning". In this example, the option 420 is selected by the operator.

Details of the options are described later.

The operator selects an "OK" button at the lower right of the screen when finishing the operation on the generation screen 400 of FIG. 6. Then, the screen is changed and the check screen 200 is displayed again.

Figure 7:
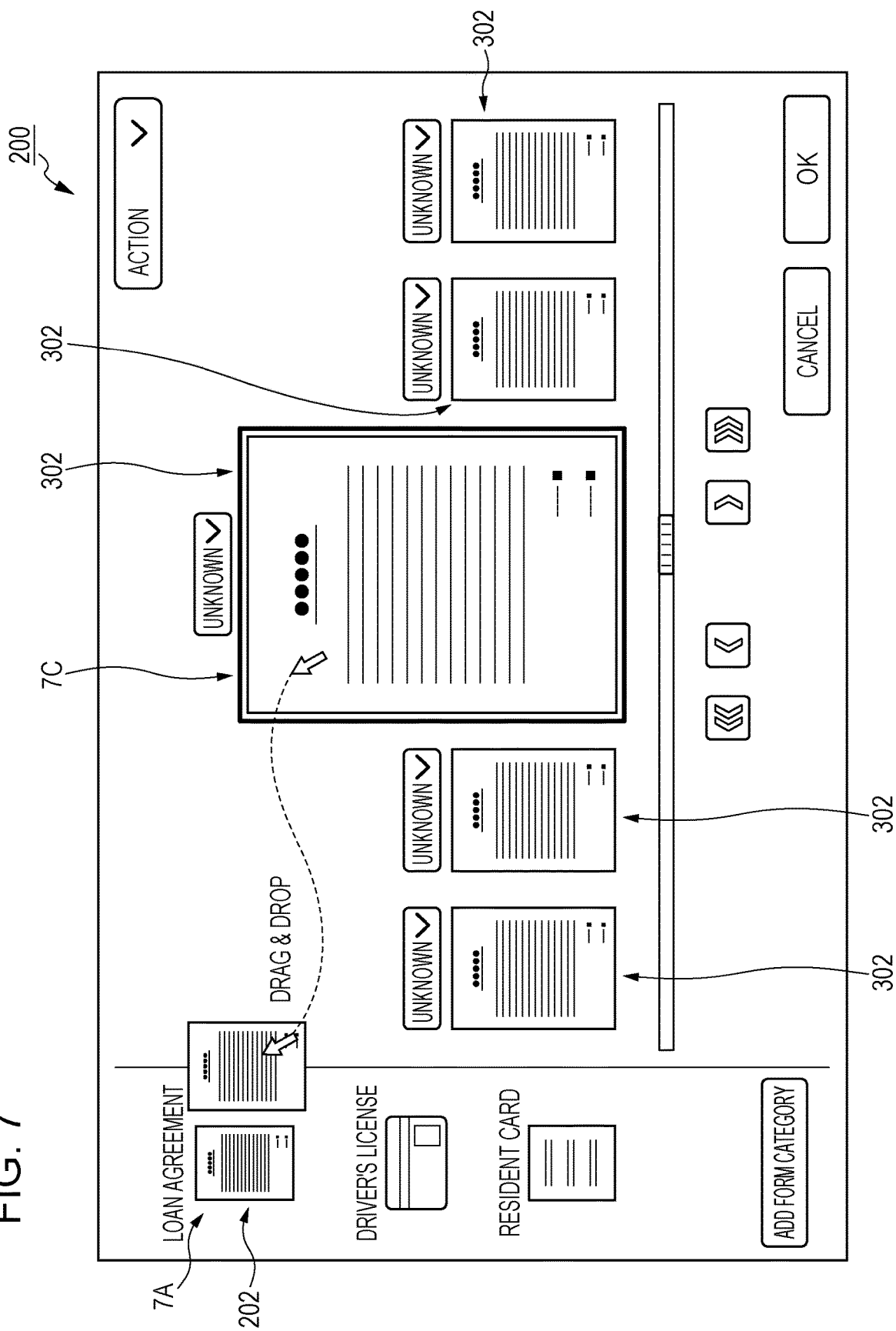
FIG. 7 illustrates the check screen displayed again.

FIG. 7 illustrates the check screen 200 displayed again.

In the check screen 200 displayed again, an icon image 202 linked to "loan agreement" is generated at the upper left of the screen as indicated by reference symbol 7A. In other words, the generated icon image 202 is linked to a category "loan agreement".

The "icon image" is an image linked to information on a category of a form. The user viewing the icon image may recognize the information on the category.

In this exemplary embodiment, the operator performs a drag-and-drop operation in this state to move a form image 302 indicated by reference symbol 7C at the center of the screen to the icon image 202 linked to "loan agreement".

In this example, the form image 302 at the center of the screen shows "loan agreement".

The operator performs the drag-and-drop operation to move the form image 302 at the center of the screen to the icon image 202 linked to the category "loan agreement".

In this exemplary embodiment, the determination information generator 30 (see FIG. 1) grasps a feature of the form image 302 at the center of the screen to acquire determination information indicating the grasped feature (hereinafter referred to as "form feature information").

The determination information generator 30 links the generated form feature information to the icon image 202 with the category "loan agreement". In other words, the determination information generator 30 links the generated form feature information to the category "loan agreement".

In this exemplary embodiment, the information on the icon image 202 linked to "loan agreement" and the form feature information obtained from the "loan agreement" are registered in the information storage 102 (see FIG. 2) while being linked together.

To grasp the feature of the form image 302, the determination information generator 30 analyzes the form image 302 to obtain, for example, a histogram of the form image 302. The histogram is grasped as the feature of the form image 302.

The method for grasping the feature of the form image 302 is not limited to the method using the histogram, and any other publicly known method may be used instead.

In this exemplary embodiment, the operator performs operation of linking the form image 302 to the icon image 202 to be used for categorizing the form.

In this exemplary embodiment, in response to reception of the operation in the information processing system 1, the determination information generator 30 acquires the form feature information on the form image 302, and links the acquired form feature information to the icon image 202.

In this exemplary embodiment, the determination information generator 30 generates the form feature information indicating the feature of the form image 302. The form feature information serves as the determination information.

The determination information generator 30 links the form feature information serving as the determination information to the icon image 202. In other words, the determination information generator 30 links the form feature information serving as the determination information to the information indicating the category "loan agreement".

In this exemplary embodiment, the form feature information is linked to the icon image 202 by moving the form image 302 to the icon image 202. The user's linking operation is not limited to this operation.

The movement of the form image 302 is not necessary, and the linking method is not particularly limited as long as the information processing system 1 may recognize the relationship between the form image 302 and the icon image 202.

Figure 8:
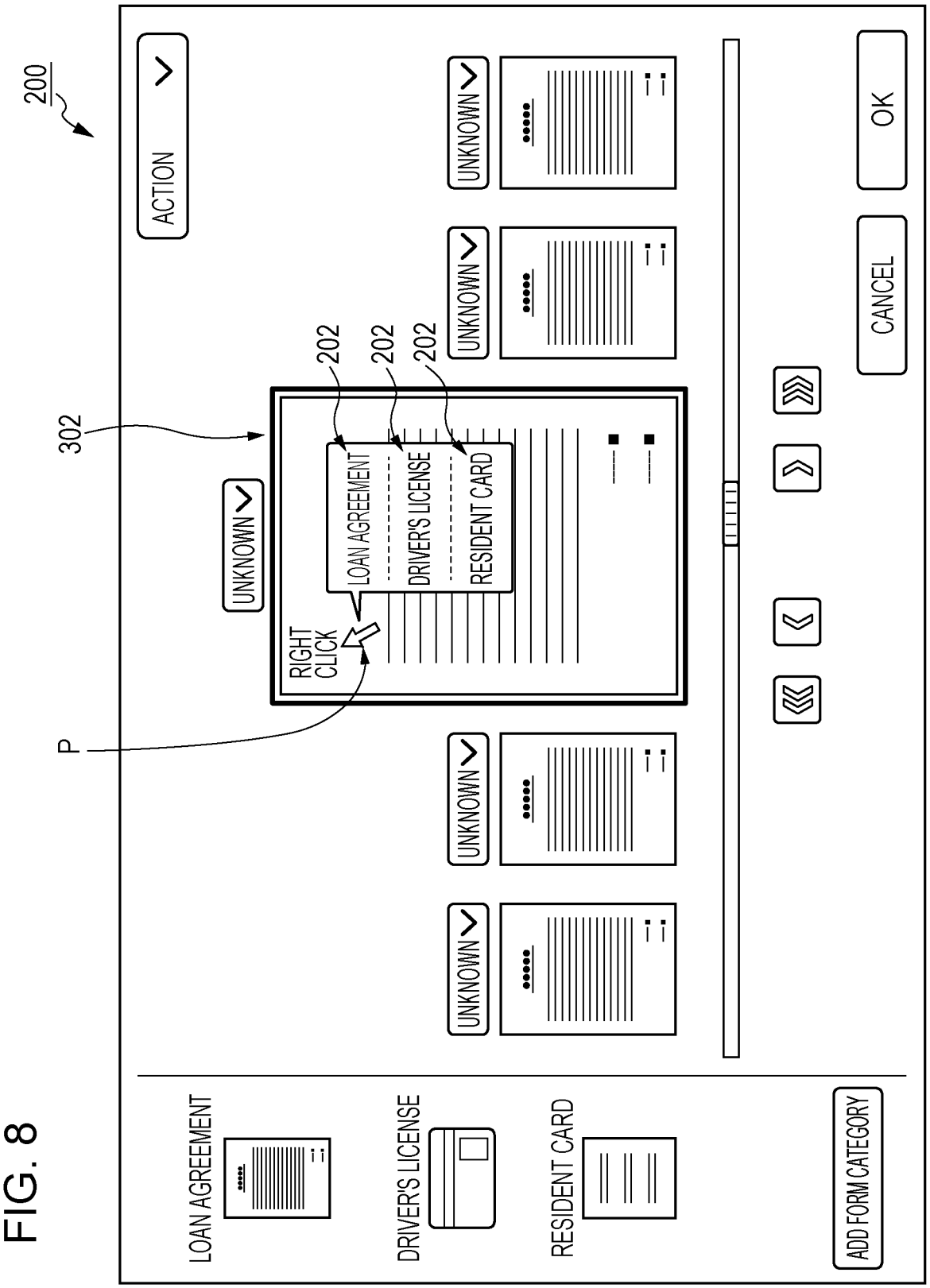
FIG. 8 illustrates another display example of the check screen.

For example, as illustrated in FIG. 8 (other display example of the check screen 200), the existing icon images 202 may be displayed by placing a pointer P of the mouse on the form image 302 and right-clicking on the form image 302.

In this example, an icon image 202 selected by the user from among the displayed icon images 202 is linked to the form feature information obtained from the form image 302.

Each icon image 202 illustrated in FIG. 8 includes a text. In this manner, the icon image 202 may have text information.

Alternatively, the icon image 202 may have an image of the text information instead of the text information itself.

In this exemplary embodiment, when a form image 302 related to "loan agreement" is newly input afterwards, the generated determination information (form feature information) is used and determination is made that the category of the newly input form image 302 is "loan agreement".

More specifically, when the form image 302 related to "loan agreement" is newly input, the category determiner 20 determines whether the form image 302 has the form feature information linked to the icon image 202 (form feature information obtained from the "loan agreement").

If the form image 302 has the form feature information linked to the icon image 202, the category determiner 20 determines that the category of the form image 302 is "loan agreement".

In other words, if another form image 302 has the feature linked to the icon image 202 (feature identified by the form feature information), the information linked to the icon image 202 is linked to the form image 302 in this exemplary embodiment.

Specifically, the information linked to the icon image 202 and indicating the category is linked to the form image 302 in this exemplary embodiment. In this case, the information indicating the category "loan agreement" is linked to the form image 302.

In this exemplary embodiment, the drag-and-drop operation is performed and the form feature information linked to "loan agreement" is generated automatically.

In this exemplary embodiment, when a form corresponding to "loan agreement" is newly input afterwards, determination is not made that the category of the newly input form is "unknown".

Determination is made that the newly input form has the automatically generated form feature information, and is therefore in the category "loan agreement".

The above description is directed to the process for linking the form image 302 at the center of the check screen 200 (see FIG. 7) to the icon image 202. Form images 302 other than the central form image 302 are similarly linked to the icon images 202.

Along with the sequence of generation of the icon images 202 linked to the form images 302 on the check screen 200, any existing icon image 202 may be linked to a form image 302 having the text "unknown".

In this case, the operator does not generate a new icon image 202 but moves the form image 302 to the existing icon image 202, thereby linking the form image 302 to the icon image 202.

Figure 9:
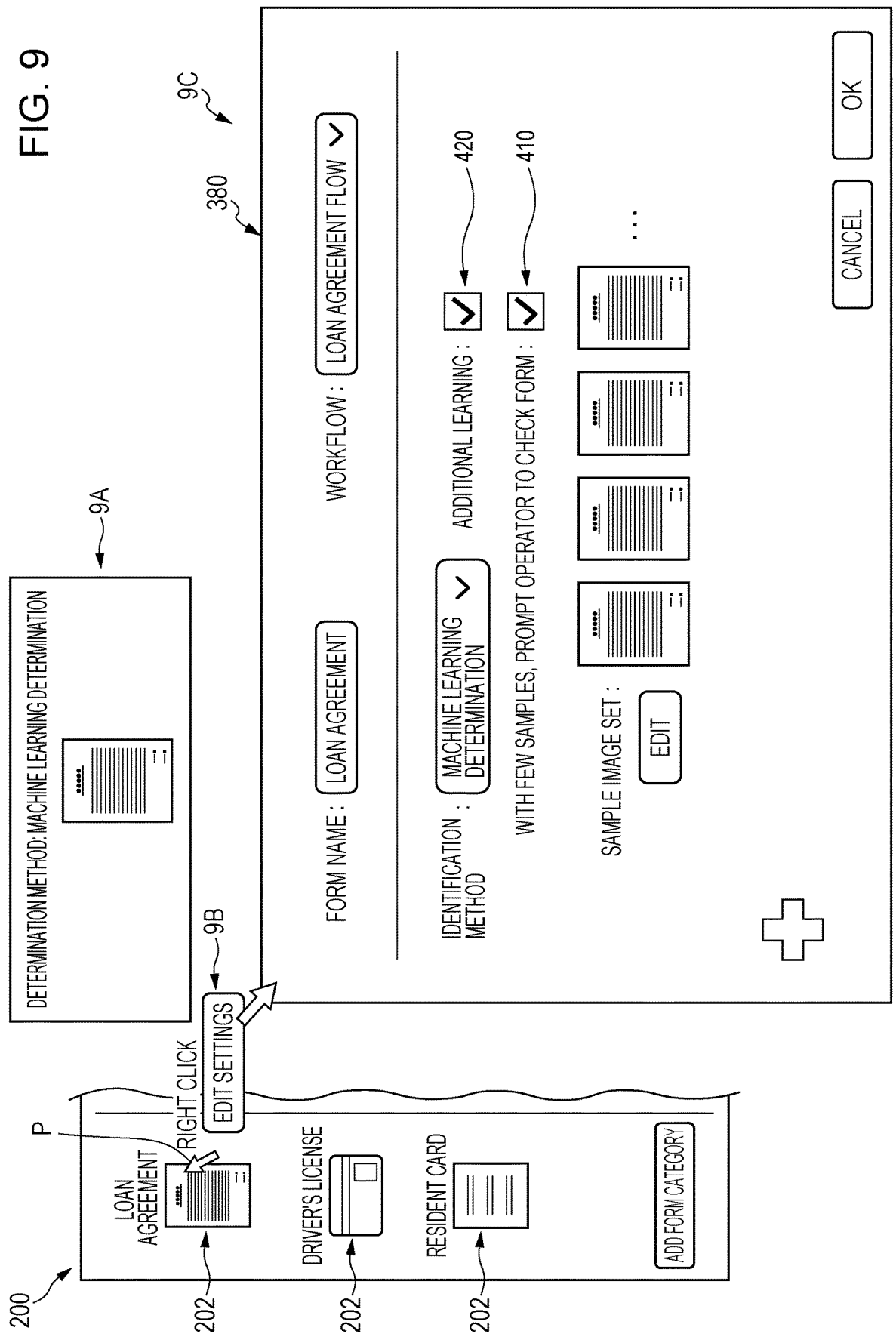
FIG. 9 illustrates another display example of the check screen.

In this exemplary embodiment, as illustrated in FIG. 9 (other display example of the check screen 200), the check screen 200 including the icon images 202 shows an indication 9A when the operator selects any icon image 202 by moving the pointer P onto the icon image 202.

The indication 9A indicates a determination method to be used by the category determiner 20 for category determination. For example, the determination method is "machine learning determination".

The "machine learning determination" is a method for determining a category of a newly input form based on form feature information acquired by analyzing a form image 302 and linked to an icon image 202.

In this exemplary embodiment, the check screen 200 shows an indication 9B that reads "Edit settings" when the operator selects the icon image 202 by right-clicking on the icon image 202 with the pointer P on the icon image 202.

When the operator selects "Edit settings", a setting check screen 380 is displayed as indicated by reference symbol 9C. On the setting check screen 380, the operator may check settings on the icon image 202.

The setting check screen 380 is identical to the generation screen 400 of FIG. 6.

Similarly to the generation screen 400 of FIG. 6, the setting check screen 380 has a field "Form name" at the upper left of the screen. In this example, a name "loan agreement" is displayed in this field.

In the setting check screen 380, the option 410 that reads "With few samples, prompt operator to check form" and the option 420 that reads "Additional learning" are selected.

Figure 10:
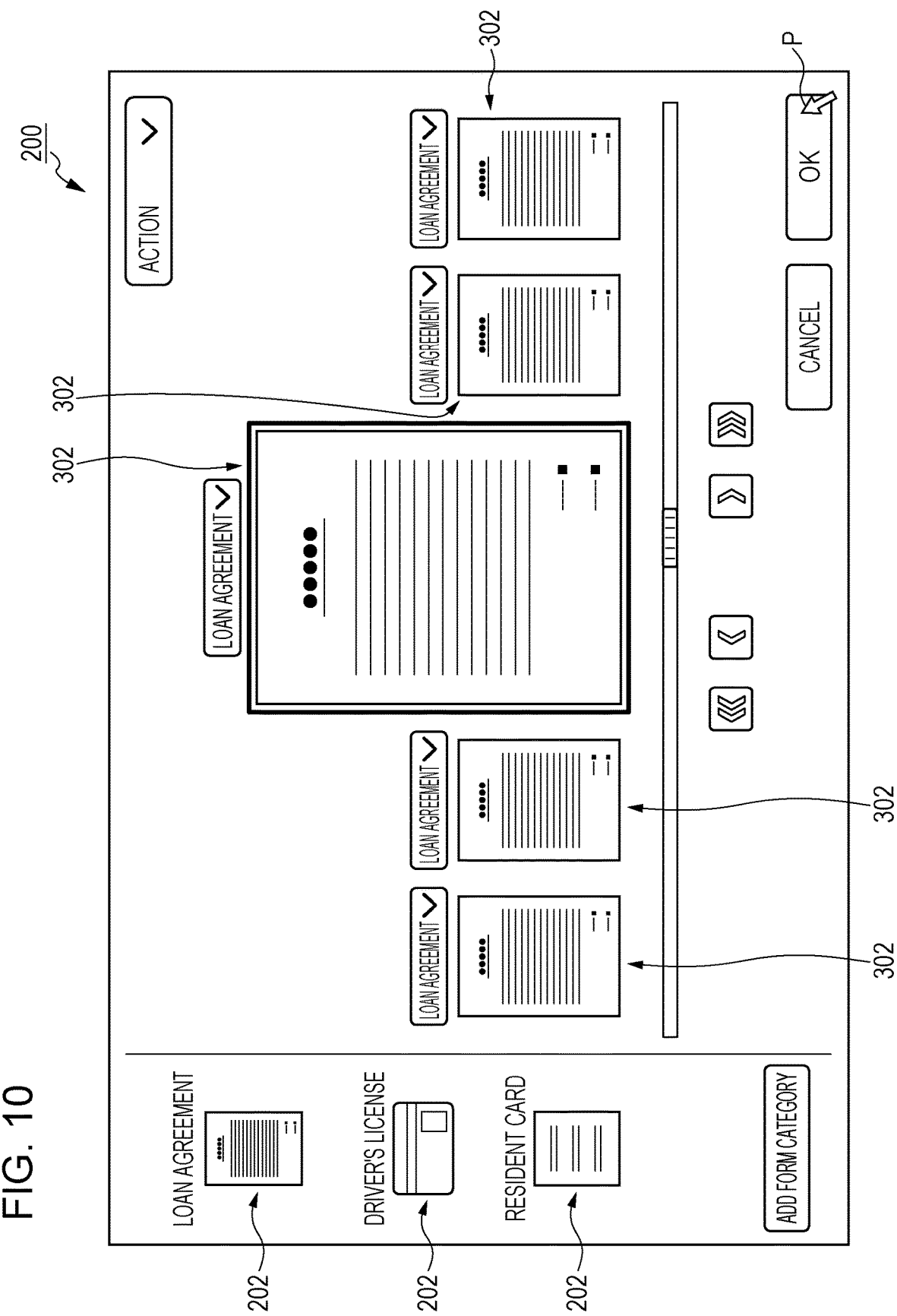
FIG. 10 illustrates the check screen showing form images linked to an icon image.

FIG. 10 illustrates the check screen 200 after the form images 302 of FIG. 7 are linked to the icon image 202.

Before the form images 302 are linked to the icon image 202, the texts "unknown" are displayed above the form images 302 as illustrated in FIG. 7.

After the linking, names linked to the icon image 202 linked to the form images 302 are displayed above the form images 302 as illustrated in FIG. 10. In other words, the category of the form in each form image 302 is displayed above the form image 302.

In this exemplary embodiment, the operator selects the "OK" button at the lower right of the check screen 200 of FIG. 10. Then, the process executor 40 executes, on the form images 302, processes linked to the categories of the form images 302.

In this exemplary embodiment, if at least one piece of form feature information is linked to a newly generated icon image 202, a category of a newly input form is determined afterwards based on the form feature information.

For example, if one piece of form feature information obtained from a form image 302 related to "loan agreement" is linked to the icon image 202 related to "loan agreement", a category of a new form corresponding to "loan agreement" is determined as "loan agreement".

In this case, the category is determined based only on one piece of form feature information obtained from one form. Thus, determination accuracy is low and erroneous determination is likely to occur.

In this exemplary embodiment, a process for prompting the operator to check results of category determination executed on newly input forms by the category determiner 20 is executed to reduce erroneous determination.

More specifically, the process for prompting the operator to check results of category determination is executed if the operator selects the option 410 that reads "With few samples, prompt operator to check form" and the number of pieces of form feature information linked to the icon image 202 (referred to as "linked information count") is smaller than a predetermined threshold.

Figure 11:
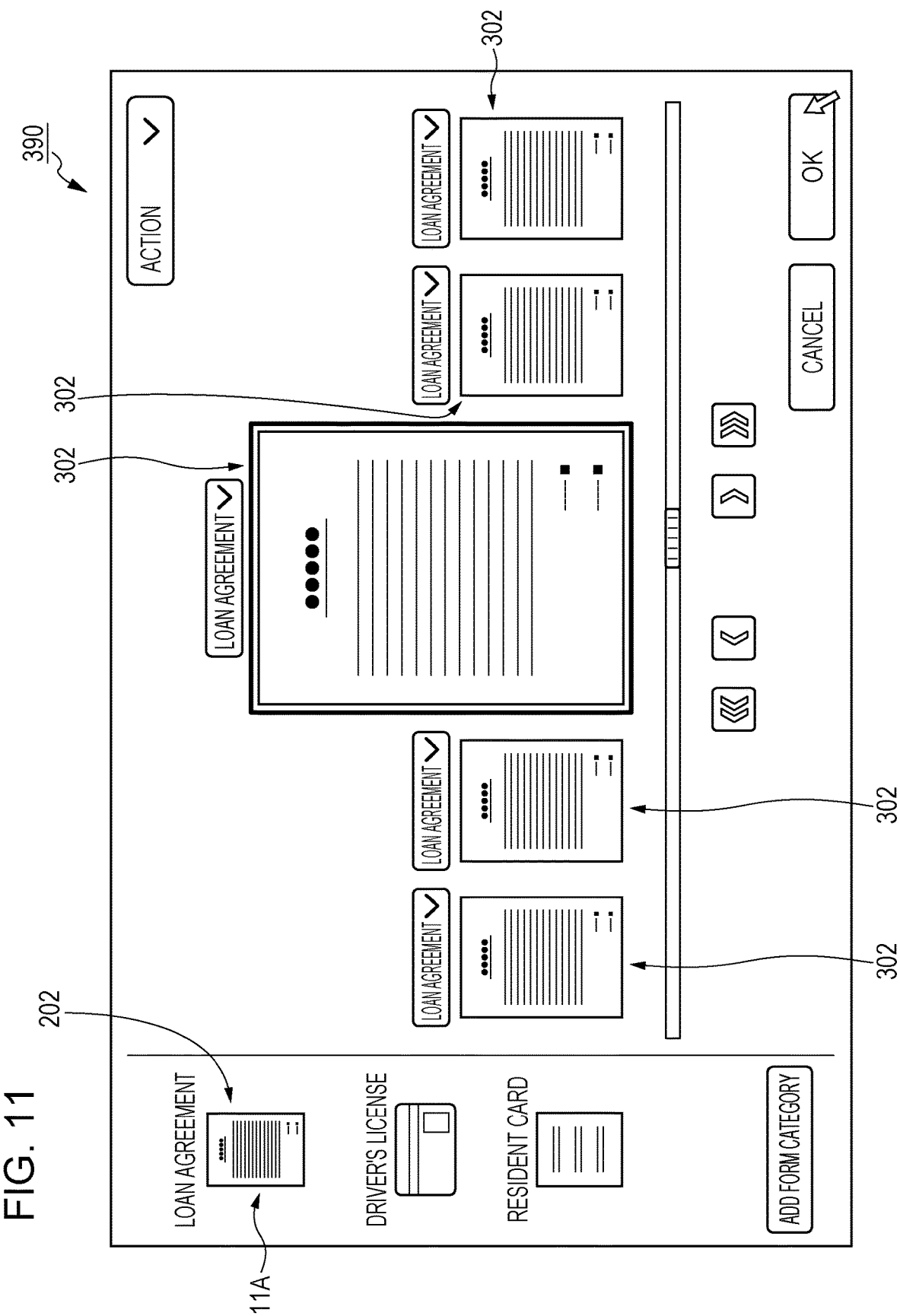
FIG. 11 illustrates a confirmation screen.

More specifically, a confirmation screen 390 of FIG. 11 is displayed to prompt the operator to check results of category determination.

The confirmation screen 390 shows a plurality of form images 302 showing forms subjected to category determination by the category determiner 20.

More specifically, the confirmation screen 390 of this example shows form images 302 showing a plurality of forms whose categories are determined to be "loan agreement" by the category determiner 20.

In the confirmation screen 390, text information indicating the category "loan agreement" is displayed in association with each form.

The operator refers to the confirmation screen 390 to confirm the results of determination executed on the forms by the category determiner 20.

In this exemplary embodiment, if the status of linking of the feature to the icon image 202 is a predetermined specific status, the operator is notified about results of grasping of the categories of other form images 302.

In this exemplary embodiment, categories of other images such as newly input form images 302 are grasped based on the feature linked to the icon image 202 (form feature information).

If the status of linking of the feature to the icon image 202 is the predetermined specific status, the operator is notified about results of grasping of the categories of the other form images 302.

More specifically, in this exemplary embodiment, if the number of form images 302 whose features are linked to the icon image 202 is smaller than a predetermined threshold, the operator is notified about results of grasping of categories of form images 302 whose categories are newly grasped.

In this exemplary embodiment, if the operator has checked the results of grasping of the categories and the results have no error, the operator selects the "OK" button at the lower right of the screen. In this case, the process executor 40 (see FIG. 1) executes the process linked to the category "loan agreement" on the forms.

In this exemplary embodiment, the categories of the other form images 302 are grasped based on the features linked to the icon images 202, and the processes linked to the grasped categories are executed on the other images.

If the status of linking of the feature to the icon image 202 is the predetermined specific status, the process linked to the category is not executed on the other form images 302.

Specifically, in this exemplary embodiment, if the number of images whose features are linked to the icon image 202 is smaller than the predetermined threshold, the process linked to the category is not executed on the form images 302.

In other words, in this exemplary embodiment, if the number of images whose features are linked to the icon image 202 is smaller than the predetermined threshold, the process linked to the category is not automatically executed on the form images 302.

In this exemplary embodiment, if the status of linking of the feature to the icon image 202 is the specific status, the process linked to the category is executed on the form images 302 in response to selection of the "OK" button and permission from the operator.

In this exemplary embodiment, the linked information count is updated to the latest count in response to selection of the "OK" button at the lower right of the screen by the operator.

Specifically, the number of form images 302 whose categories are currently checked by the operator is added to the linked information count of the form feature information linked to the icon image 202 linked to "loan agreement" (icon image 202 indicated by reference symbol 11A). In this manner, the linked information count is updated to the latest count.

The form of "loan agreement" may be determined to be "unknown" due to, for example, a processing error though the icon image 202 linked to "loan agreement" exists.

In this case, the operator performs a drag-and-drop operation to move the form image 302 showing the form determined to be "unknown" to the icon image 202 related to "loan agreement".

A form other than "loan agreement" may erroneously be determined to be "loan agreement".

In this case, the operator performs a drag-and-drop operation to move the form image 302 showing the form erroneously determined to be "loan agreement" to an icon image 202 linked to a correct form.

A category of a form may be determined to be "unknown" because no icon image 202 is generated, and a form image 302 whose category is "unknown" may be displayed accordingly.

In this case, the user generates a new icon image 202 and links the form image 302 having the text "unknown" to the new icon image 202.

Figure 12:
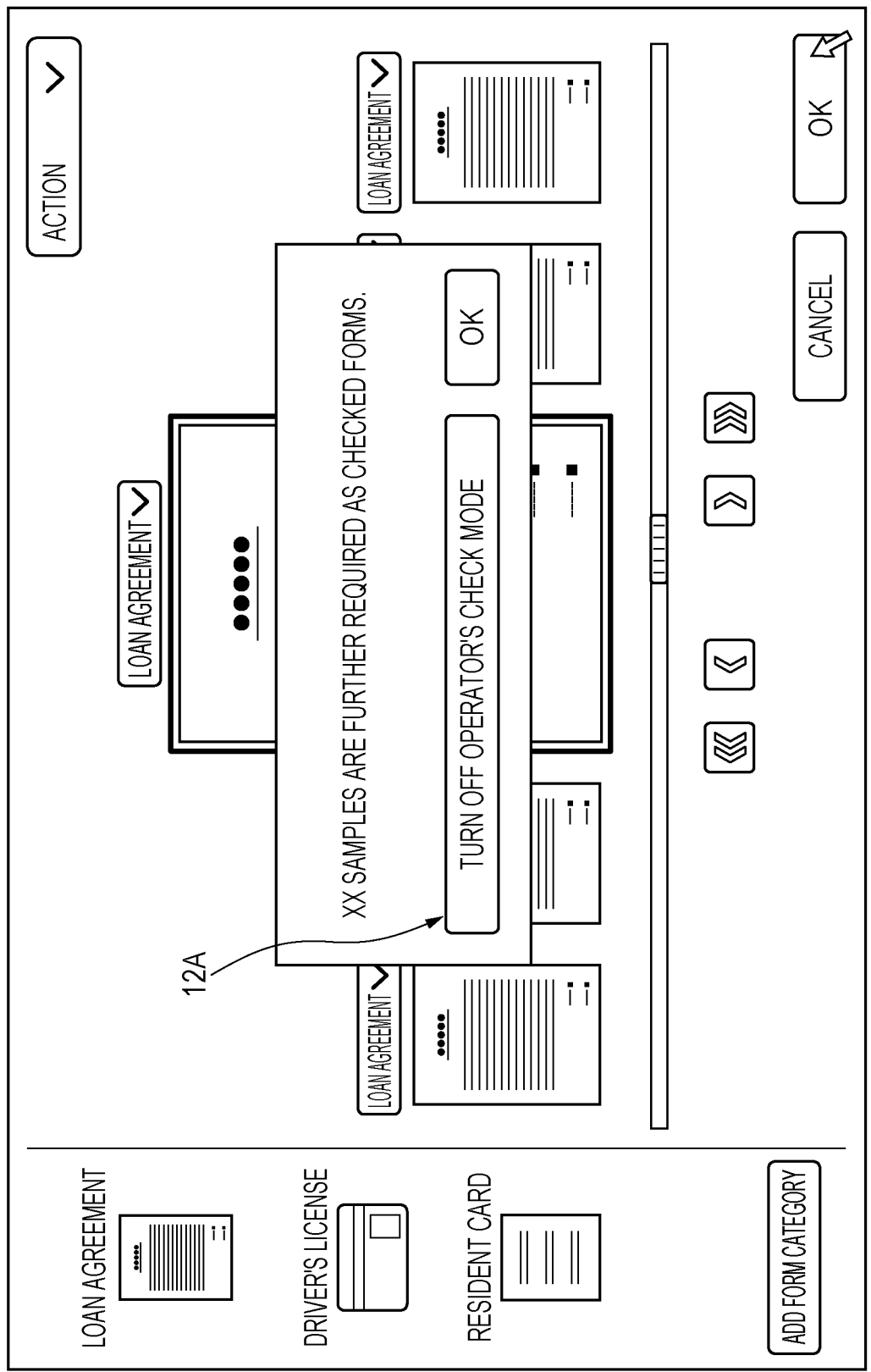
FIG. 12 illustrates a display screen after the operator selects an "OK" button in the confirmation screen.

FIG. 12 illustrates a display screen after the operator selects the "OK" button in the confirmation screen 390 of FIG. 11. In other words, FIG. 12 illustrates a display screen in a case where the operator instructs the process executor 40 to start a process.

It is assumed that the operator instructs the process executor 40 to start the process in a state in which the option 410 that reads "With few samples, prompt operator to check form" (see FIG. 6) is selected and the linked information count is small.

In this case, information on the number of images is displayed as illustrated in FIG. 12.

More specifically, the process executor 40 outputs information on the number of images whose features are linked to the icon image 202, and information on the number of images is displayed as illustrated in FIG. 12 along with the output information.

In this example, the displayed information indicates the number of samples required for the form image 302. In other words, the information indicates that the linked information count is small and does not reach the predetermined threshold.

In this exemplary embodiment, if the number of images whose features are linked to the icon image 202 is smaller than the predetermined threshold, the process executor 40 outputs information indicating that the number of images to link their features to the icon image 202 is insufficient. In this exemplary embodiment, this information is displayed.

The information on the number of images whose features are linked to the icon image 202 may be the information on the insufficient number of images, or information on the number of linked images.

FIG. 12 illustrates information on the number of form images 302 to be checked by the operator for their categories.

In other words, FIG. 12 illustrates information on the number of form images 302 to be visually checked by the user for their categories.

In other words, FIG. 12 illustrates information on the number of pieces of form feature information to be linked to the icon image 202.

In this exemplary embodiment, the information is displayed as illustrated in FIG. 12 until the number of form images 302 linked to the icon image 202 reaches the predetermined threshold.

In this exemplary embodiment, if the number of form images 302 linked to the icon image 202 does not reach the predetermined threshold, the process executor 40 is prohibited from starting the process unless the information is displayed as illustrated in FIG. 12.

FIG. 12 illustrates a button 12A for receiving termination of selection of the option 410 from the operator.

Specifically, the button is displayed to receive, from the operator, termination of selection of the option 410 that reads "With few samples, prompt operator to check form".

In this exemplary embodiment, if the operator operates the button to give an instruction to terminate the selection, the confirmation screen 390 of FIG. 11 is not displayed afterwards.

In this case (the instruction is given to terminate the selection), the process executor 40 automatically executes the process afterwards. In other words, the process executor 40 starts the process even if the instruction to start the process is not given from the operator.

Figure 13:
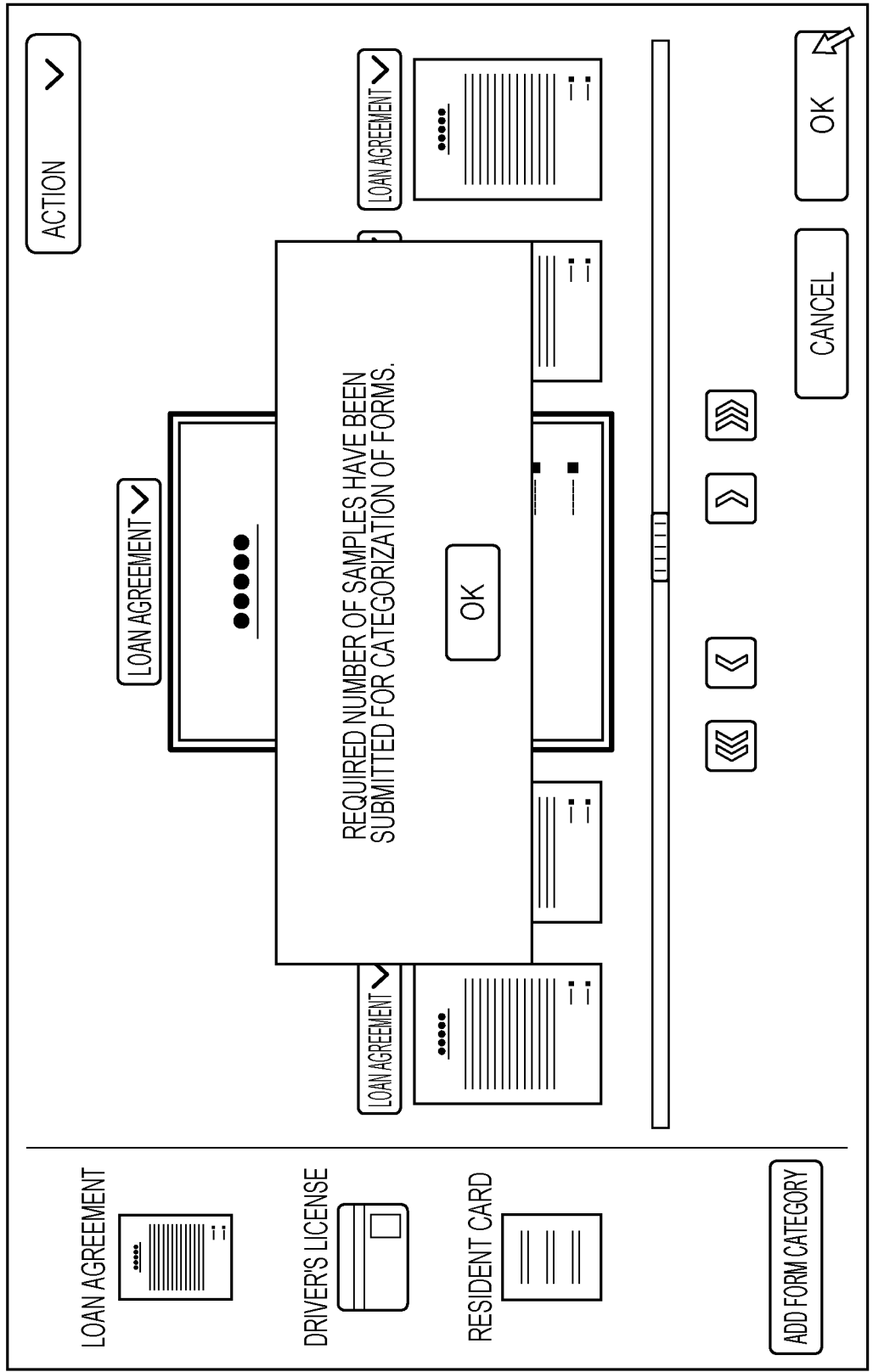
FIG. 13 illustrates another example of the screen after the "OK" button in the confirmation screen is selected.

FIG. 13 illustrates another example of the screen after the "OK" button in the confirmation screen 390 of FIG. 11 is selected.

In this exemplary embodiment, the screen of FIG. 13 is displayed if the option 410 that reads "With few samples, prompt operator to check form" is selected but the "OK" button is selected with a sufficient number of samples.

The screen of FIG. 13 shows information indicating that the number of samples is sufficient. In other words, this screen shows information indicating that the number of form images 302 to be linked to the icon image 202 reaches the predetermined threshold.

If the number of samples is sufficient, the confirmation screen 390 of FIG. 11 is not displayed afterwards.

If the number of samples is sufficient, the information of FIG. 12 is not even displayed afterwards. That is, the information on the number of images whose features are linked to the icon image 202 is not displayed.

In this exemplary embodiment, if the number of images whose features are linked to the icon image is smaller than the predetermined threshold, the information on the number of images is output and displayed as described above.

If the number of images whose features are linked to the icon image is not smaller than the predetermined threshold, the information on the number of images is not output or displayed.

In this exemplary embodiment, the option 420 that reads "Additional learning" is also present as illustrated in FIG. 6.

In this exemplary embodiment, if the option 420 is selected and a category of a newly input form image 302 is determined automatically or the operator links the form image 302 to any icon image 202, form feature information is acquired from this form image 302.

New determination information is generated based also on the acquired form feature information.

More specifically, new determination information linked to the category of this form image 302 is generated based on the acquired form feature information as well as the form feature information acquired previously.

In this exemplary embodiment, the category of the newly input form image 302 is determined automatically or by the operator.

If the option 420 that reads "Additional learning" is selected, new determination information is generated based on both the form feature information obtained from the newly input form image 302 and the existing form feature information.

More specifically, in this exemplary embodiment, the category of the form image 302 is basically determined automatically unless the category of the form is determined to be "unknown".

If the option 420 that reads "Additional learning" is selected, new determination information is generated based on the form feature information of the form image 302 whose category is determined automatically and the form feature information acquired previously.

In a case of a form whose category is determined to be "unknown", the form image 302 is linked to any icon image 202 by the operator. Thus, the category of the form image 302 is substantially determined.

If the option 420 that reads "Additional learning" is selected, new determination information is generated based on the form feature information of the form image 302 whose category is determined by the operator and the form feature information acquired previously.

Figure 14:
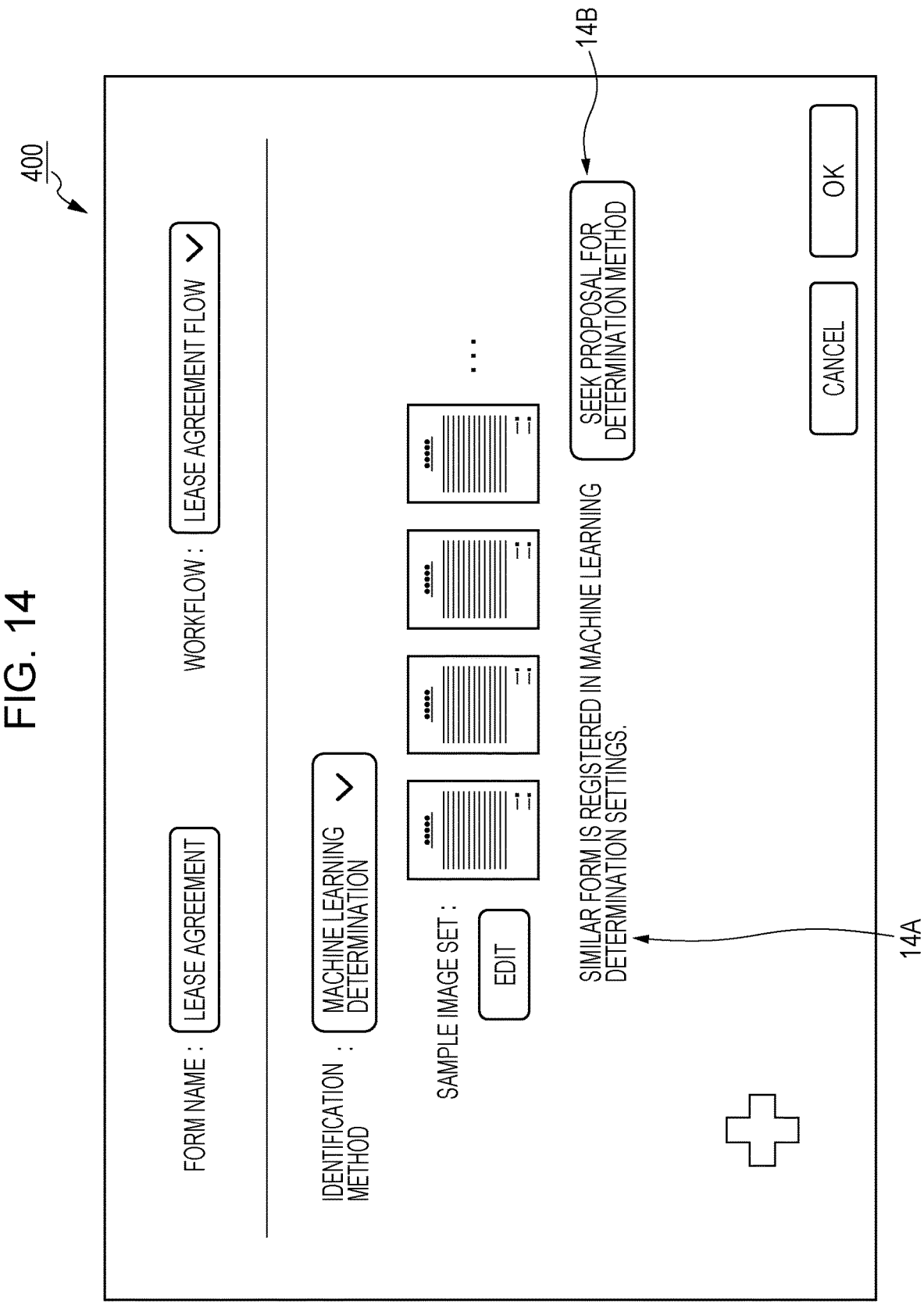
FIG. 14 illustrates the generation screen to be displayed when the operator generates an icon image linked to "lease agreement" different from "loan agreement"

FIG. 14 illustrates the generation screen 400 to be displayed when the operator generates an icon image 202 linked to "lease agreement" different from "loan agreement".

More specifically, the generation screen 400 of this example is displayed when a form image 302 related to "lease agreement" different from "loan agreement" is input to the information processing system 1 (see FIG. 1).

FIG. 14 illustrates the generation screen 400 in a case where determination information linked to "lease agreement" is not registered and a category of the form image 302 related to "lease agreement" is determined to be "unknown".

FIG. 14 illustrates the generation screen 400 in a case where the operator generates the icon image 202 linked to "lease agreement".

In this example, the generation screen 400 shows information 14A indicating that a similar form is registered. In other words, the information indicates that similar determination information is registered.

More specifically, the form of "loan agreement" is similar to a form of "lease agreement". Along with this, the form feature information (determination information) of "loan agreement" is similar to form feature information of "lease agreement". Therefore, the information indicates that the similar determination information is registered.

In this example, the similarity of the two pieces of form feature information is smaller than a predetermined first threshold and therefore determination is made that the pieces of form feature information differ from each other. However, the similarity is larger than a second threshold (<first threshold).

In this exemplary embodiment, when new form feature information is obtained from the form determined to be "unknown", the new form feature information is linked to a corresponding icon image 202. At this time, the similarity of the new form feature information and the registered form feature information is determined.

If the similarity is smaller than the first threshold, the two pieces of form feature information differ from each other. Therefore, categories of forms of "lease agreement" input to the information processing system 1 may be determined afterwards.

If the similarity is larger than the second threshold, however, erroneous determination may be made between "lease agreement" and "loan agreement".

In this exemplary embodiment, if the form feature information similar to the new form feature information exists when linking the new form feature information to a new icon image 202, the information 14A of FIG. 14 is displayed to notify the operator that the similar form exists.

In this exemplary embodiment, a process for reducing erroneous determination is executed.

Figure 15:
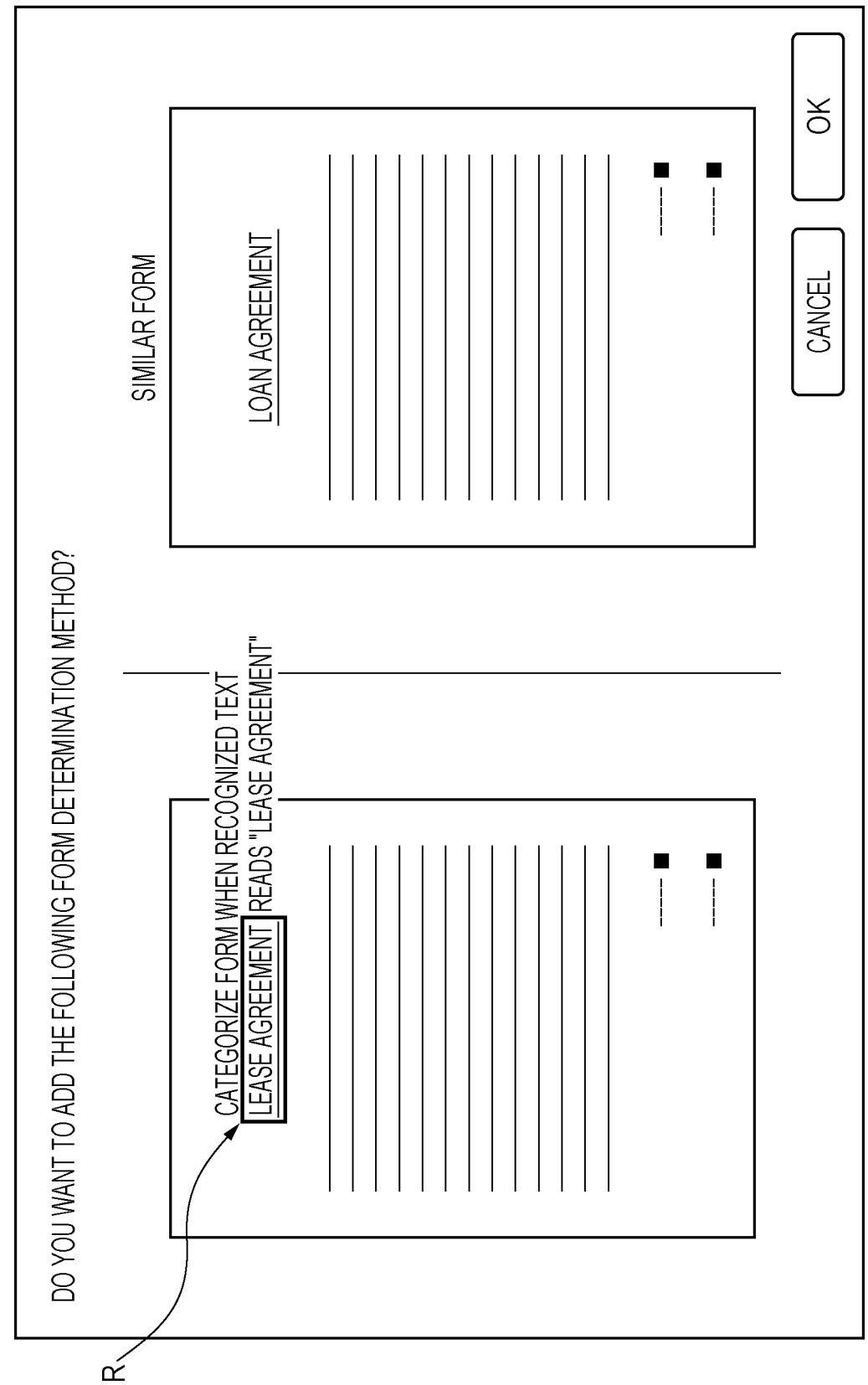
FIG. 15 illustrates a reference screen for the operator.

Specifically, in this exemplary embodiment, if the operator selects an item 14B that reads "Seek proposal for determination method" on the screen of FIG. 14, the operator is notified about determination information for determination of the category "lease agreement" as illustrated in FIG. 15 (reference screen for the operator).

More specifically, in this exemplary embodiment, if the operator selects the item 14B that reads "Seek proposal for determination method" on the screen of FIG. 14, determination information for determination of the form of "lease agreement" is generated and the operator is notified about the determination information.

Specifically, information indicating that text determination is executed and information indicating how a process of the text determination is executed are generated as the determination information for determination of the form of "lease agreement" in this example. The operator is notified about those pieces of information as illustrated in FIG. 15.

More specifically, determination information indicating that "if a text read by OCR is 'lease agreement', a category of the form is determined to be 'lease agreement'" is generated in this example. The operator is notified about this determination information.

To notify the operator about the text determination, the determination information generator 30 first extracts a coordinate region R where the form of "lease agreement" has a particularly large difference from the form of "loan agreement".

The determination information generator 30 acquires text information in the coordinate region R of the "lease agreement". In this exemplary embodiment, text information "lease agreement" is acquired.

In this case, the determination information generator 30 generates determination information indicating that "if the text read by OCR is 'lease agreement', the category of the form is determined to be 'lease agreement'."

If the operator selects the "OK" button at the lower right of the screen of FIG. 15, categories of forms are determined for "lease agreement" afterwards through the machine learning determination and the text determination.

In other words, to determine the form category "lease agreement" in this exemplary embodiment, determination is made whether the form is "lease agreement" by executing not only the machine learning determination but also the text determination.

More specifically, to determine the form category "lease agreement", determination is made whether the form is "lease agreement" by determining whether the text "lease agreement" is included in a predetermined specific portion.

The "text determination" is a method for determining a category of a form based on whether the form includes a predetermined registered text.

In this exemplary embodiment, the determination method may be changed. For example, the determination method may be deleted or selected in response to the operator's operation on a screen of FIG. 16 (reference screen for the operator who wants to change the determination method).

Specifically, the determination method may be deleted by selecting a button 16A on the screen. In this example, the machine learning determination and the text determination are displayed. The machine learning determination and/or the text determination may be deleted by selecting the button(s) 16A.

In this example, the determination method may be selected. The machine learning determination may be selected by selecting a button 16B. In this example, the text determination may be selected by selecting a button 16C.

In the example described above, the text determination is added automatically. In response to selection of a symbol "+" 16D, a screen (not illustrated) for addition of the text determination is displayed and the operator may manually add the text determination.

In this exemplary embodiment, a determination method such as determination using a registered file name, determination using a barcode or a QR code, or determination using a partial image may be added as described later by selecting the symbol "+".

FIG. 17 illustrates a priority table.

In this exemplary embodiment, information on the order of execution of form category determination is preregistered in a priority table 480. The priority table 480 is stored in the information storage 102 (FIG. 2).

In this exemplary embodiment, the operator presets priority levels for individual form categories, and the priority levels are registered in the priority table 480.

The category determiner 20 determines a category of a form in accordance with the priority levels registered in the priority table 480. More specifically, in response to input of form data, the category determiner 20 determines a category of a form in the order of the priority levels registered in the priority table 480.

Specifically, in this exemplary embodiment, in response to input of a form (form data), the category determiner 20 first determines whether the input form is "lease agreement" by executing "text determination, machine learning determination" linked to priority level "1".

Specifically, the category determiner 20 determines whether the input form has the form feature information obtained from the "lease agreement" and whether the input form includes the text "lease agreement".

If the two conditions are satisfied, the category determiner 20 determines that the category of the form is "lease agreement". In this case, the process executor 40 (see FIG. 1) executes, on the form, the process linked to the category "lease agreement".

In other words, the category determiner 20 determines whether the input form that is an example of another image has the feature (feature information) linked to the icon image 202 related to "lease agreement".

The category determiner 20 also determines whether the input form includes the text information "lease agreement" that is an example of preregistered information.

If the input form has the feature linked to the icon image 202 related to "lease agreement" and includes the text information "lease agreement", the category determiner 20 links the information linked to the icon image 202 related to "lease agreement" to the input form.

Specifically, the category determiner 20 links the information "lease agreement" to the input form. In other words, the category determiner 20 links the information indicating the form category "lease agreement" to the input form.

In this case, the process executor 40 executes, on the input form, the process linked to the category "lease agreement".

If the option 410 that reads "With few samples, prompt operator to check form" is selected and the number of pieces of form feature information linked to the icon image 202 is smaller than the predetermined threshold, the confirmation screen 390 is displayed as illustrated in FIG. 11.

If the option 420 that reads "Additional learning" is selected, new determination information is generated by adding form feature information obtained from the input form ("lease agreement").

In this exemplary embodiment, the determination about "lease agreement" is made by using the text determination and the machine learning determination, but the determination method is not limited thereto. The determination about "lease agreement" may be made by using the text determination alone.

Next, description is made of a process in a case where determination is not made at priority level "1" that the category of the form is "lease agreement".

In this case, the category determiner 20 determines whether the category of the form is "loan agreement" by executing "machine learning determination" linked to priority level "2".

Specifically, the category determiner 20 determines whether the input form image 302 has the form feature information obtained by linking the form image 302 related to "loan agreement" to the icon image 202.

In other words, the category determiner 20 determines whether the input form image 302 has the form feature information linked to the icon image 202 related to "loan agreement".

If the input form image 302 has the form feature information, the category determiner 20 determines that the category of the form is "loan agreement".

In this case, the process executor 40 executes, on the form, the process linked to the category "loan agreement".

If the option 410 that reads "With few samples, prompt operator to check form" is selected and the number of pieces of form feature information linked to the icon image 202 is smaller than the predetermined threshold similarly to the above, the confirmation screen 390 is displayed as illustrated in FIG. 11.

If the option 420 that reads "Additional learning" is selected, new determination information is generated by adding form feature information obtained from the form image 302 related to "loan agreement".

In this processing example, there is a strong possibility that the form of "lease agreement" that may be determined erroneously to be "loan agreement" has already been determined to be "lease agreement" at priority level "1".

Next, description is made of a process in a case where determination is not made at priority level "2" that the category of the form is "loan agreement".

In this case, the category determiner 20 determines whether the category of the form is "driver's license" by executing "machine learning determination" linked to priority level "3".

Specifically, the category determiner 20 determines whether the input form has a feature identified by form feature information obtained by linking the "driver's license" to an icon image 202.

If the input form has this feature, the category determiner 20 determines that the category of the form is "driver's license". In this case, the process executor 40 executes, on the form, a process linked to the category "driver's license".

If the option 410 that reads "With few samples, prompt operator to check form" is selected and the number of pieces of form feature information linked to the icon image 202 is smaller than the predetermined threshold similarly to the above, the confirmation screen 390 is displayed as illustrated in FIG. 11.

If the option 420 that reads "Additional learning" is selected similarly to the above, new determination information is generated by adding form feature information obtained from the form image 302 related to "driver's license".

Next, description is made of a process in a case where determination is not made at priority level "3" that the category of the form is "driver's license".

In this case, the category determiner 20 determines whether the category of the form is "resident card" by executing determination using "registered file name" linked to priority level "4".

Specifically, the category determiner 20 determines whether the file name of the input form is a preregistered file name. If this condition is satisfied, the category determiner 20 determines that the category of the form is "resident card". In this case, the process executor 40 executes, on the form, a process linked to the category "resident card".

Next, description is made of a process in a case where determination is not made at priority level "4" that the category of the form is "resident card".

In this case, the category determiner 20 determines whether the category of the form is "transmittal letter" by executing determination using "barcode, QR code" linked to priority level "5".

Specifically, the category determiner 20 determines whether the barcode or the QR code is present at a predetermined portion of the input form image 302.

If this condition is satisfied, the category determiner 20 determines that the category of the form is "transmittal letter". In this case, the process executor 40 executes, on the form, a process linked to the category "transmittal letter".

Next, description is made of a process in a case where determination is not made at priority level "5" that the category of the form is "transmittal letter".

In this case, the category determiner 20 determines whether the category of the form is "design drawing" by executing determination using "partial image (template matching)" linked to priority level "6".

Specifically, the category determiner 20 determines whether the input form image 302 includes a preregistered image. If this condition is satisfied, the category determiner 20 determines that the category of the form is "design drawing". In this case, the process executor 40 executes, on the form, a process linked to the category "design drawing".

Next, description is made of a process in a case where determination is not made at priority level "6" that the category of the form is "design drawing".

In this case, the category determiner 20 determines that the category of the form is "unknown". In this case, the check screen 200 is displayed as illustrated in FIG. 5.

In this case, the operator generates an icon image 202, and links the form image 302 determined to be "unknown" to the icon image 202.

Alternatively, the form image 302 determined to be "unknown" is linked to any existing icon image 202. The "unknown" determination may be made erroneously. In this case, the form image 302 determined to be "unknown" is linked to any existing icon image 202.

Figure 18:
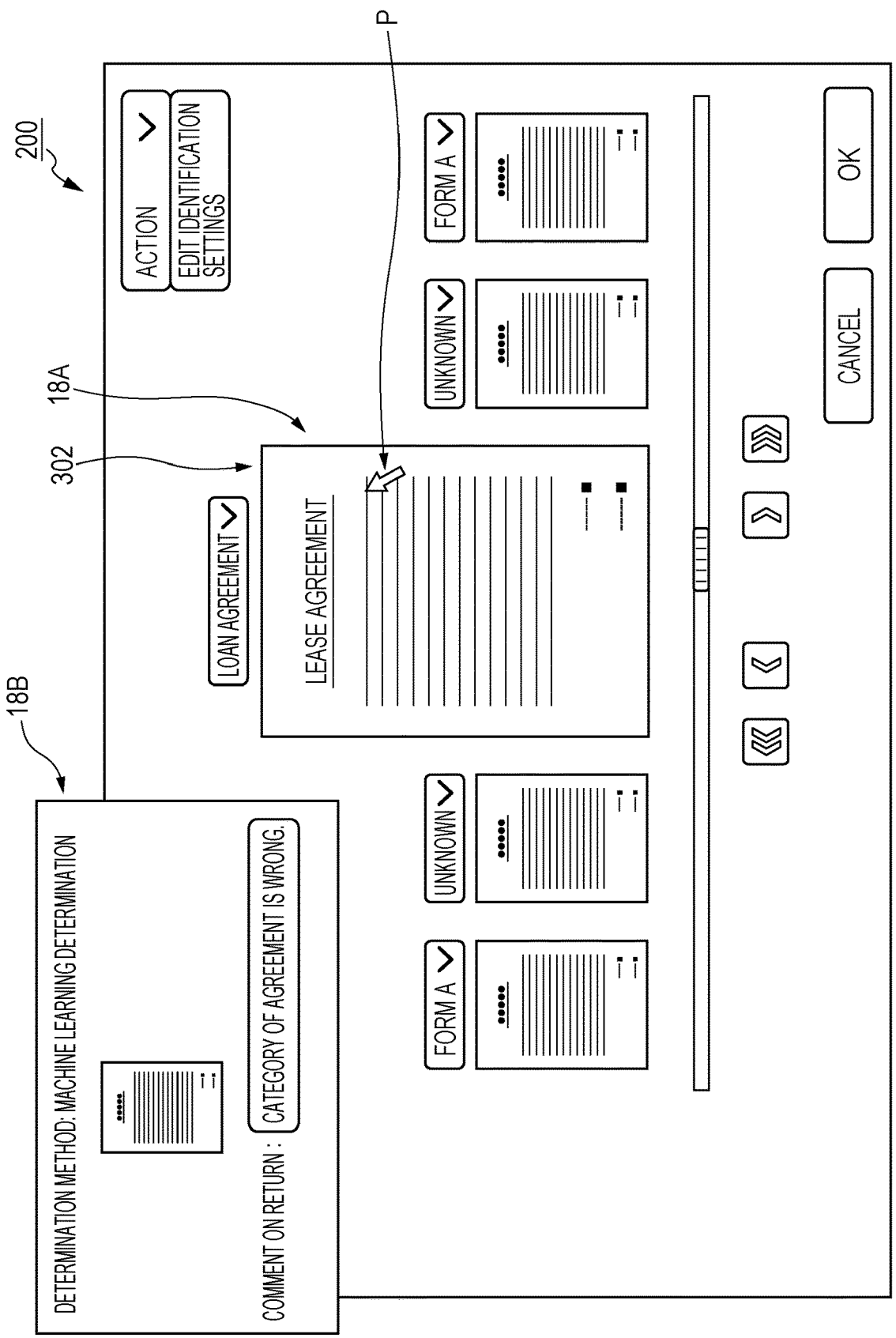
FIG. 18 illustrates another display example of the check screen showing a returned form.

FIG. 18 illustrates another display example of the check screen 200 showing a returned form.

In this display example, a category of a form 18A is "lease agreement" but determined to be "loan agreement". Therefore, the form is returned.

In this exemplary embodiment, if the operator selects the displayed form (form image 302) by placing the pointer P on the form, a determination method 18B for use in determination about the form is displayed. In this example, "machine learning determination" is displayed as the determination method.

Figure 16:
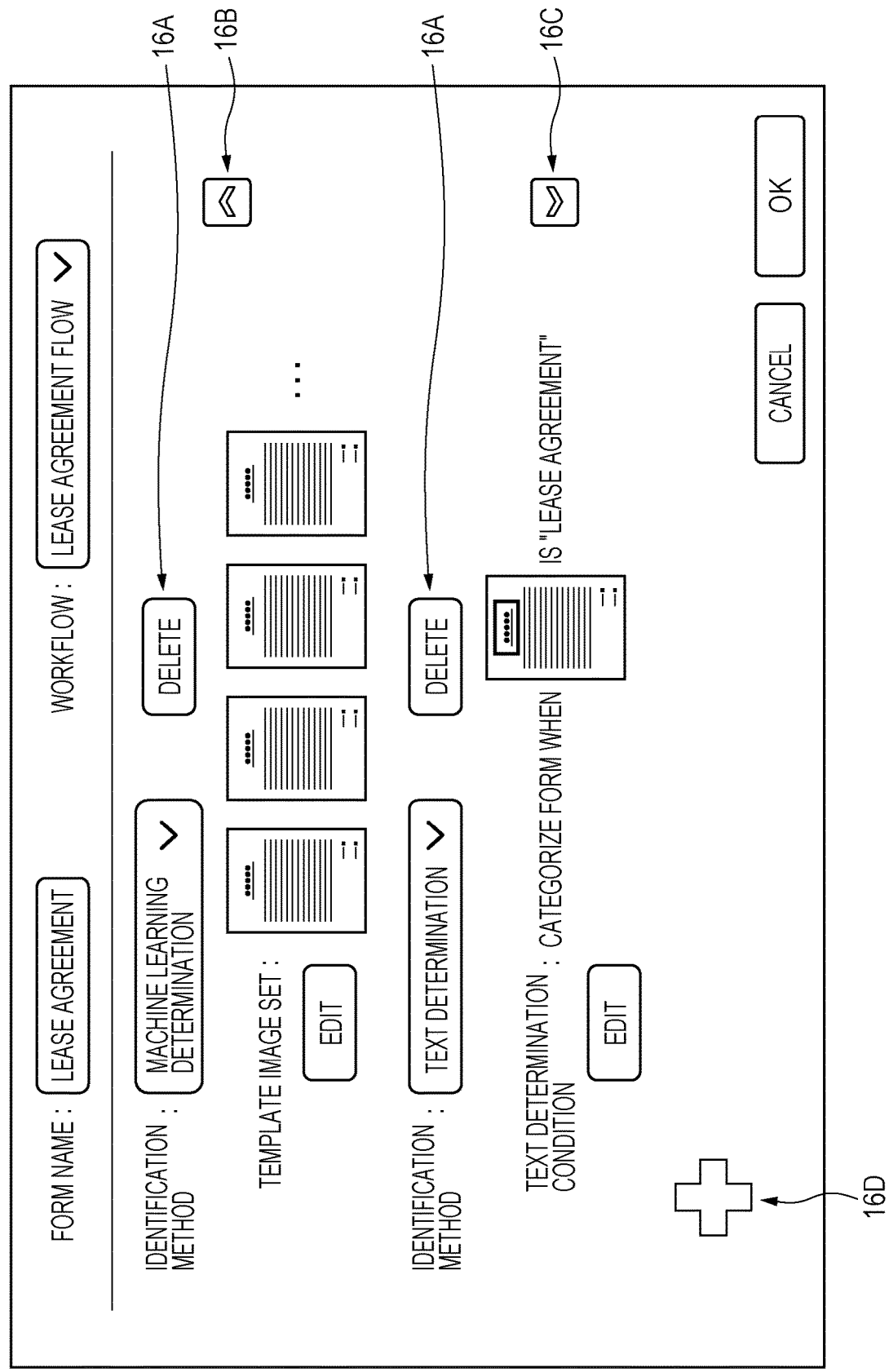
FIG. 16 illustrates a reference screen for the operator who wants to change a determination method.

In this exemplary embodiment, if the operator selects an item "Edit identification settings" displayed by selecting an item "Action" at the upper right of the check screen 200, the screen of FIG. 16 is displayed. Thus, the determination method may be added or changed.

If the screen of FIG. 16 is operated and the determination method is changed to, for example, "text determination", an input form of "lease agreement" is correctly determined to be "lease agreement" afterwards.

In this exemplary embodiment, the operator may promptly retry the category determination after the determination method is changed to "text determination".

Figure 19:
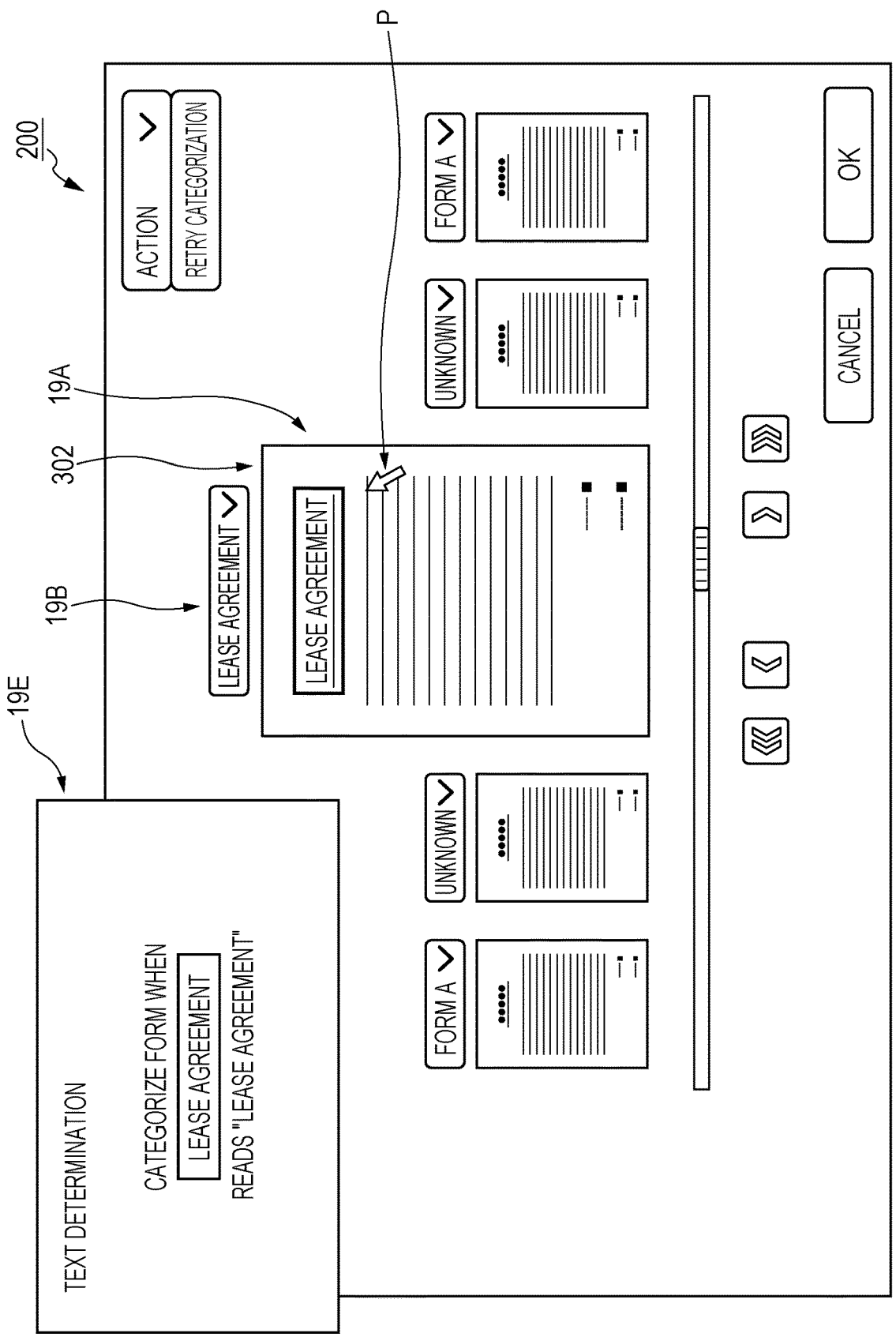
FIG. 19 illustrates a display example of the check screen.

Specifically, in this exemplary embodiment, if the operator selects an item "Retry categorization" displayed by selecting the item "Action" at the upper right in FIG. 19 (display example of the check screen 200), text determination is made on a form 19A (identical to the form 18A in FIG. 18). In this case, a correct category "lease agreement" 19B is displayed.

If the pointer P is placed on the displayed form in the check screen 200 of FIG. 19 similarly to the above, a determination method 19E for use in the determination about the form is displayed.

In this example, the machine learning determination is changed to the text determination, and the text determination is displayed as indicated by reference symbol 19E.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to:
- determine, for each data of a first plurality of data, either (i) a category of the data or (ii) that the category of the data is unknown, based on machine learning using first links between data features and data categories, the first links being stored in a storage;
- display, on a display, (i) icon images corresponding to the data categories, and (ii) a plurality of images of respective data of the first plurality of data for which the category of the data is unknown, and
- in response to reception of a user operation, on the display, to associate a target image of the plurality of images with a target icon image of the icon images, store, in the storage, a feature of the data associated with the target image in association with the category corresponding to the target icon image, wherein the icon images each include a graphical image indicating the corresponding data category.

2. The information processing system according to claim 1 wherein the processor is further configured to determine, for each data of a second plurality of data, either (i) the category of the data or (ii) that the category of the data is unknown, based on machine learning using second links between the data features and the data categories, the second links being stored in the storage, and the second links including a link between the feature of the data associated with the target image and the category corresponding to the target icon image.

3. The information processing system according to claim 1, wherein the feature of the data associated with the target image is a histogram of an image of a document containing the data associated with the target image.

4. The information processing system according to claim 3, wherein
the processor is further configured to, for a second plurality of data, determine either (i) a category of the new data or (ii) that the category of the new data is unknown by comparing a histogram of the new data with the histogram of the data associated with the target image stored in association with the category.

5. A non-transitory computer readable medium storing a program causing a computer to execute a process comprising:
- determining, for each data of a first plurality of data, either (i) a category of the data or (ii) that the category of the data is unknown, based on machine learning using first links between data features and data categories, the first links being stored in a storage;
- displaying, on a display, (i) icon images corresponding to the data categories, and (ii) a plurality of images of respective data of the first plurality of data for which the category of the data is unknown; and
- in response to a user operation, on the display, to associate a target image of the plurality of images with a target icon image of the icon images, storing, in the storage, a feature of the data associated with the target image in association with the category corresponding to the target icon image, wherein the icon images each include a graphical image indicating the corresponding data category.

6. An information processing system comprising:
- means for determining, for each data of a first plurality of data, either (i) a category of the data or (ii) that the category of the data is unknown, based on machine learning using first links between data features and data categories, the first links being stored in a storage;
- means for displaying (i) icon images corresponding to the data categories, and (ii) a plurality of images of respective data of the first plurality of data for which the category of the data is unknown; and
- means for storing, in response to reception of a user operation, on the means for displaying, to associate a target image of the plurality of images with a target icon image of the icon images, a feature of the data associated with the target image in association with the category corresponding to the target icon image, wherein the icon images each include a graphical image indicating the corresponding data category.

* * * * *